United States Patent
Cselle et al.

(10) Patent No.: US 10,943,270 B1
(45) Date of Patent: Mar. 9, 2021

(54) SCALABLE NATIVE IN-STREAM ADVERTISING FOR MOBILE APPLICATIONS AND WEBSITES

(71) Applicant: Twitter, Inc., San Francisco, CA (US)

(72) Inventors: Gabor Cselle, San Francisco, CA (US); Nassar Stoertz, Burlingame, CA (US); Tural Badirkhanli, San Francisco, CA (US); Carl Joseph Blubaugh, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 189 days.

(21) Appl. No.: 16/215,309

(22) Filed: Dec. 10, 2018

Related U.S. Application Data

(63) Continuation of application No. 14/561,984, filed on Dec. 5, 2014, now Pat. No. 10,152,731.

(60) Provisional application No. 62/066,628, filed on Oct. 21, 2014, provisional application No. 61/913,183, filed on Dec. 6, 2013.

(51) Int. Cl.
*G06Q 30/00* (2012.01)
*G06Q 30/02* (2012.01)

(52) U.S. Cl.
CPC ..... *G06Q 30/0276* (2013.01); *G06Q 30/0277* (2013.01)

(58) Field of Classification Search
CPC ............... G06Q 30/0276; G06Q 30/0277
USPC ............................ 705/14.64, 14.49
See application file for complete search history.

(56) References Cited

U.S. PATENT DOCUMENTS

| | | | |
|---|---|---|---|
| 7,752,202 B2 | 7/2010 | Kobori et al. | |
| 8,667,532 B2 | 3/2014 | Heath | |
| 9,549,227 B2 * | 1/2017 | Campbell | H04L 65/4084 |
| 10,152,731 B1 * | 12/2018 | Cselle | G06Q 30/0277 |
| 10,275,804 B1 | 4/2019 | Cselle et al. | |
| 2007/0061300 A1 | 3/2007 | Ramer et al. | |
| 2008/0215428 A1 | 9/2008 | Ramer et al. | |
| 2009/0248524 A1 * | 10/2009 | Defoy | G06Q 30/02 |
| | | | 705/14.1 |
| 2011/0055209 A1 | 3/2011 | Novac et al. | |
| 2011/0258046 A1 | 10/2011 | Ramer et al. | |
| 2011/0258049 A1 | 10/2011 | Ramer et al. | |
| 2012/0027816 A1 | 2/2012 | Kusumba et al. | |

(Continued)

FOREIGN PATENT DOCUMENTS

| | | | | |
|---|---|---|---|---|
| JP | 07021159 A | * | 1/1995 | G06F 17/21 |
| JP | 07021159 A | | 1/1995 | |

(Continued)

OTHER PUBLICATIONS

IT Training and Assessment Unit, Jun. 2012 Queen's University Belfast. Retrieved online Jul. 23, 2018 https://www.qub.ac.uk/directorates/media/Media,300678,en.pdf (Year: 2012).*

(Continued)

*Primary Examiner* — James A Reagan
(74) *Attorney, Agent, or Firm* — Smith Baluch LLP

(57) ABSTRACT

A method for processing ads involves traversing an ad view hierarchy to obtain ad view information for a device, providing the ad view information to an ad server, sending, by the device, an ad request to the ad server, receiving, in response to the ad request, an ad. and displaying the ad on the device.

16 Claims, 12 Drawing Sheets

(56) References Cited

U.S. PATENT DOCUMENTS

| | | | |
|---|---|---|---|
| 2012/0059708 A1* | 3/2012 | Galas | G06Q 30/0244 705/14.43 |
| 2012/0278164 A1 | 11/2012 | Spivack et al. | |
| 2013/0159431 A1 | 6/2013 | Berry et al. | |
| 2013/0198331 A1 | 8/2013 | Ho et al. | |
| 2014/0011562 A1 | 1/2014 | Smith et al. | |
| 2014/0055803 A1* | 2/2014 | Uhlig | G06F 40/14 358/1.13 |
| 2014/0067542 A1* | 3/2014 | Everingham | G06Q 30/0241 705/14.64 |
| 2014/0068692 A1* | 3/2014 | Archibong | H04N 21/23424 725/116 |
| 2014/0115625 A1 | 4/2014 | Mccoy et al. | |
| 2014/0282126 A1 | 9/2014 | Ma | |
| 2016/0104201 A1 | 4/2016 | Greenberg et al. | |

FOREIGN PATENT DOCUMENTS

| | | | |
|---|---|---|---|
| JP | 2003091476 A | 3/2003 | |
| WO | WO-2010003129 A2 * | 1/2010 | G06F 16/334 |

OTHER PUBLICATIONS

Google Maps Platform. Autocomplete for Addresses and Search Terms. (Oct. 8, 2013). Retrieved online Dec. 27, 2020. https://developers.google.com/maps/documentation/javascript/places-autocomplete (Year: 2013).*

Queen's University Belfast. IT Training and Assessment Unit. (Jun. 2012). Retrieved online Dec. 27, 2020 htttps://www.qub.ac.uk/directorates/media/Media,300678,en.pdf (Year: 2012).*

Amendment in Response to Office Action dated Jun. 23, 2017, from U.S. Appl. No. 14/561,984, filed Nov. 24, 2017, 25 pp.

Amendment in Response to Office Action dated May 31, 2017, from U.S. Appl. No. 14/562,012, filed Nov. 8, 2017, 19 pp.

Final Office Action from U.S. Appl. No. 14/562,012, dated May 31, 2017, 24 pp.

IT Training and Assesment Unit, Queen's University Belfast. Retrieved online Jul. 23, 2018 https://www.qub.ac.uk/directorates/media/Media.300678.en.pdf, Jun. 2012 2 pages.

Office Action from U.S. Appl. No. 14/561,984, dated Jun. 23, 2017, 20 pp.

Prosecution History from U.S. Appl. No. 14/562,012, dated Nov. 10, 2016 through Mar. 19, 2019, 259 pp.

U.S. Appl. No. 14/561,984, by Gabor Cselle, filed Dec. 5, 2014.

U.S. Appl. No. 16/215,309, filed Dec. 10, 2018, naming inventors Cselle et al.

Hemley, "26 Tips to Create a Strong Social Media Content Strategy," accessed from https://www.socialmediaexaminer.com/26-tips-to-create-a-strong-social-media-content-strategy/, Jun. 25, 2013, 35 pp.

"Making best use of Outlook 2010 using Microsoft Exchange," IT Training and Assesment Unit, Queen's University Belfast. accessed from https://www.qub.ac.uk/directorates/media/Media.300678.en.pdf, Jun. 2012, 2 pages.

Prosecution History from U.S. Appl. No. 14/561,984, dated Nov. 10, 2016 through Mar. 19, 2019, 259 pp.

U.S. Appl. No. 16/398,021, filed Apr. 29, 2019, naming inventors Cselle et al.

* cited by examiner

Ad Setup
940

Ad Name: [ ]

Advertiser Name: [ ]

Advertiser Icon: [ Select Icon ]

Ad Image: [ Select Image ] [ Edit Image ]

Text variations help your ad fit different formats without cutting off your message. Only one version will be used in each ad.

Short Text: [ Last-minute hotel deals. ]

Medium Text: [ Download Hotel App now and book a great room in seconds ]

Advertiser Icon: [ Book amazing last-minute hotel rooms at incredible rates in over 100 destinations. Download Hotel App now. ]

Ad Action Setup
942

Action Type:
[ Install app specified by URL ]
[ Application Rating ]
[ Open URL with an in-app browser ]

Action URL: [ https://abcde.com/serve?action... ]

Notes: [ Select Icon ]

---

Ad Preview 1
944

Short text + small image

Ad Preview 2
946

Medium text + medium sized image

Ad Preview 3
948

Short text + large sized image

Ad Preview 4
950

Medium text + action button linked to Action URL

FIG. 9C

SCALABLE NATIVE IN-STREAM ADVERTISING FOR MOBILE APPLICATIONS AND WEBSITES

CROSS-REFERENCE TO RELATED APPLICATIONS

This application is a continuation of, and claims the benefit of, U.S. patent application Ser. No. 14/561,984, filed on Dec. 5, 2014, and entitled "Scalable Native In-Stream Advertising for Mobile Applications and Websites," which further claims the benefit of U.S. Provisional Patent Application Ser. No. 61/913,183, filed on Dec. 6, 2013, and entitled: "Methods and Apparatus for Scalable Native In-Stream Advertising in Mobile Applications and Websites," and U.S. Provisional Patent Application Ser. No. 62/066,628, filed on Oct. 21, 2014, and entitled: "Scalable Native In-Stream Advertising for Mobile Applications and Websites," each of which are hereby incorporated by reference in their entirety.

BACKGROUND

Advertising on websites and/or mobile devices typically involves simply inserting a banner ad of a standard size at a fixed position on the screen. A standard size is helpful because advertisers understand the size and how it will look, as well as enabling advertisers to easily advertise across a variety of locations. However, "banner blindness" is a phenomenon whereby users become conditioned to ignore the standardized banners since they are so ubiquitous. Native advertising is a type of advertising that allows the developers and publishers of applications to present advertising within the stream of content, which benefits the publishers by decreasing banner blindness and improving ad revenue, while also benefiting the users by not reserving a substantial amount of screen real estate for the permanent display of ads.

COPYRIGHT NOTICE

A portion of the disclosure of this patent document may contain material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

SUMMARY

In general, in one aspect, the invention relates to a method for processing ads, comprising: traversing an ad view hierarchy to obtain ad view information for a device; providing the ad view information to an ad server; sending, by the device, an ad request to the ad server; receiving, in response to the ad request, an ad; and displaying the ad on the device.

In general, in one aspect, the invention relates to a method for processing ads, comprising: sending, by a device, an ad request to an ad server; receiving, in response to the ad request, a plurality of ad properties, wherein the plurality of ad properties comprise a uniform resource locator (URL) for an image and a plurality of text options; obtaining the ad format for the ad; selecting a text option from the plurality of text options based on the ad format; sending the URL to an image processing server, wherein the URL specifies a resize method for resizing the image and dimensions for a resized image; receiving the resized image from the image processing server; displaying the resized image on the device; and displaying the text option on the device.

In general, in one aspect, the invention relates to a method for processing ads, comprising: sending, by a device, an ad request to an ad server; receiving, in response to the ad request, a plurality of ad properties, wherein the plurality of ad properties comprise an image and a plurality of text options; obtaining the ad format for the ad; selecting a text option from the plurality of text options based on the ad format; sending the image to an image processing server for resizing; receiving the resized image from the image processing server; displaying the resized image on the device; and displaying the text option on the device.

In general, in one aspect, the invention relates to a method for processing ads, comprising: sending, by a device, an ad request to an ad server; receiving, in response to the ad request, a plurality of ad properties, wherein the plurality of ad properties comprise a universal resource locator (URL) for an image and a plurality of text options; obtaining the ad format for the ad; selecting a text option from the plurality of text options based on the ad format; obtaining the image using the URL; resizing the image by the device to obtain a resized image; displaying the resized image on the device; and displaying the text option on the device.

In general, in one aspect, the invention relates to a device that includes functionality to: traverse an ad view hierarchy to obtain ad view information for the device; provide the ad view information to an ad server; send an ad request to the ad server; receive, in response to the ad request, an ad; and display the ad.

In general, in one aspect, the invention relates to a device that includes functionality to: send an ad request to an ad server; receive, in response to the ad request, a plurality of ad properties, wherein the plurality of ad properties comprises a universal resource locator (URL) for an image and a plurality of text options; obtain the ad format for the ad; select a text option from the plurality of text options based on the ad format; send the URL to an image processing server, wherein the URL specifies a resize method for resizing the image and dimensions for a resized image; receive the resized image from the image processing server; display the resized image; and display the text option.

In general, in one aspect, the invention relates to a device that includes functionality to: send an ad request to an ad server; receive, in response to the ad request, a plurality of ad properties, wherein the plurality of ad properties comprises an image and a plurality of text options; obtain the ad format for the ad; select a text option from the plurality of text options based on the ad format; send the image to an image processing server for resizing; receive the resized image from the image processing server; display the resized image; and display the text option.

In general, in one aspect, the invention relates to a device that includes functionality to: send an ad request to an ad server; receive, in response to the ad request, a plurality of ad properties, wherein the plurality of ad properties comprises a universal resource locator (URL) for an image and a plurality of text options; obtain the ad format for the ad; select a text option from the plurality of text options based on the ad format; obtain the image using the URL; resize the image by the device to obtain a resized image; display the resized image; and display the text option.

BRIEF DESCRIPTION OF DRAWINGS

FIGS. 9A, 9B, and 9C show an example of previewing an advertisement in accordance with one or more embodiments of the invention.

DETAILED DESCRIPTION

Figure 1:
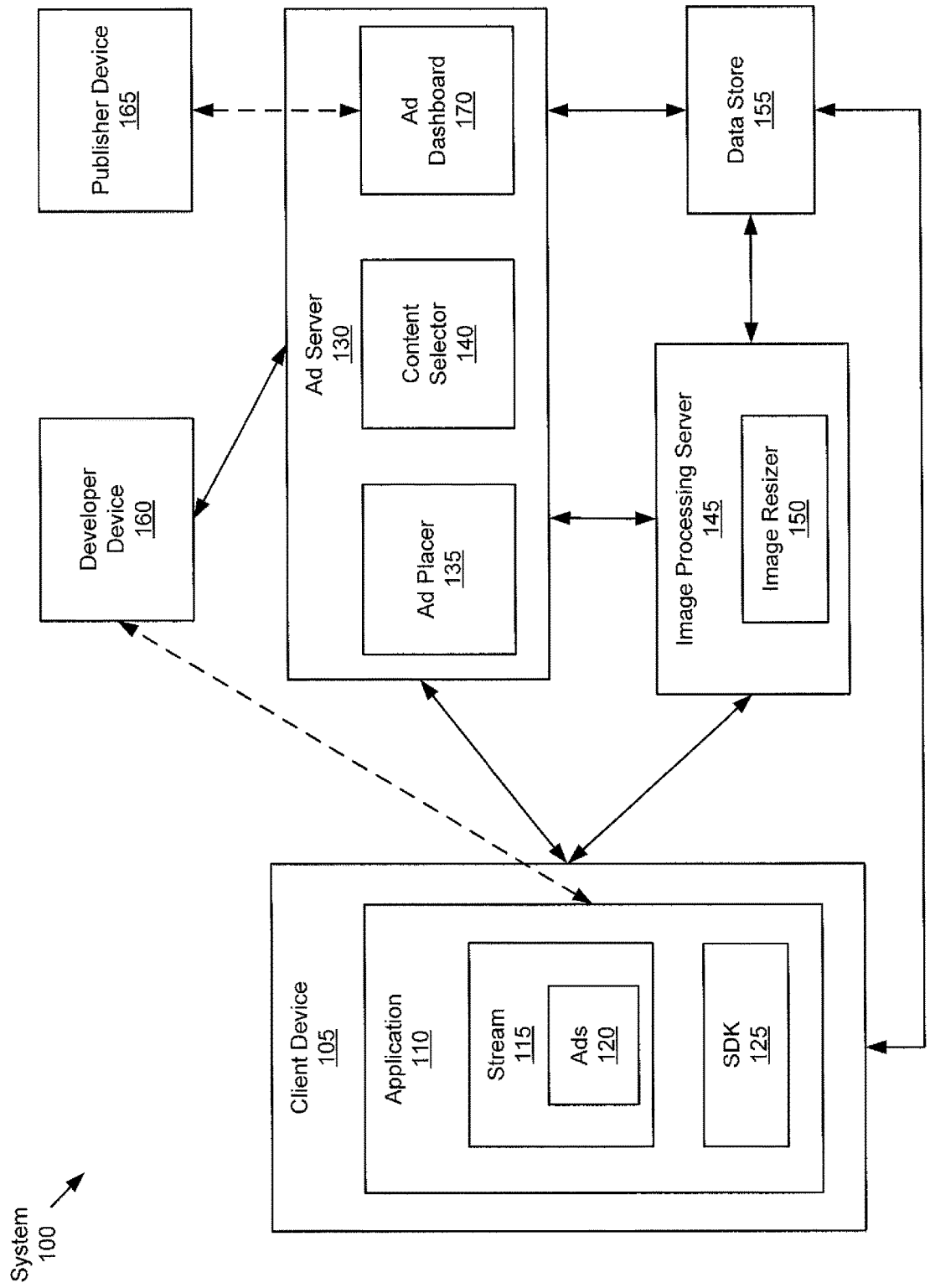
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout this detailed description the terms "ad" and "advertisement" may be used interchangeably. Additionally, the advertisements referred to throughout this specification are "native" ads, whether or not the adjective "native" is included when referring to an advertisement. To aid in the understanding of the invention, a few terms will be defined. A developer is the creator(s) of an application. The developer may decide whether or not to allow advertisements to appear in his or her application, and/or the format in which the advertisements will appear. A publisher is an entity that distributes applications (e.g., in FIG. 1, 110) or a serves websites that displays advertisements that to the users of the application or the website. A publisher may work with any number of advertisers and/or developers. The advertiser is the entity for which the advertisements are being shown.

In general, embodiments of the invention provide a method, system, and/or computer readable medium for processing native ads. Specifically, a device may send an ad request to an ad server, and receive ad properties in response, where a uniform resource locator (URL) for an image and text options are included in the ad properties. A layout for the ad may be obtained and a text option is selected. The URL may be sent to an image processing server for resizing, or the resizing may be performed on the client device. Once the image is resized, the image and text are displayed in the stream of an application as a native advertisement.

FIG. 1 shows system (100) which includes client device (105), application (110), stream (115), ads (120), software development kit (SDK) (125), ad server (130), ad placer (135), content selector (140), ad dashboard (170), image processing server (145), image resizer (150), data store (155), developer device (160), and publisher device (165). Each of these components is described below.

In one or more embodiments, client device (105) may be any computing device, such as a smart phone, mobile phone, handheld gaming device, smart watch, personal digital assistant (PDA), laptop computer, desktop computer, etc. While client device (105) is preferably a mobile device, client device (105) may be a non-mobile device. Client device (105) may include any suitable hardware components (not shown) such as a display, touchscreen, speakers, microphone, other input devices, processors, memory, etc. In various embodiments of the invention, the client device (105) is communicatively connected to ad server (130), image processing server (145) and/or data store (155) via wired and/or wireless communications using any suitable communication standard, such as WiFi, cellular data, etc.

In one or more embodiments, client device (105) has one or more applications installed, such as application (110). Application (110) may be any executable code (e.g., binary code) capable of executing on client device (105). Application (110) may be installed by the user or owner of client device (105), or may come installed by the manufacturer of client device (105). Examples of types of programs that application (110) may be include, but are not limited to: web browsers, social networking, messaging, financial, games, productivity, financial, video, photography, etc. In one or more embodiments, application (110) includes a stream (115). The stream (115) is a presentation of, list of, or other organization of content within application (110). The stream (115) may include both content and ads (120). Additional details about streams (115) are described in FIG. 2B. Ads (120) are advertisements provided by the ad server (130). Specifically, in one or more embodiments, ads (120) are native advertisements. Native advertisements are advertisements that match the form and/or function of the platform on which they appear. In other words, rather than appear separate from the stream in a space reserved for advertisements, native ads appear inside the stream in a format and appearance similar to the content. The developer (or another entity or party) may choose to differentiate advertisements substantially in style or marking from the content in the stream to make it clear to the user that the given item is an advertisement, not content. Additionally, in one or more embodiments, depending on the application (110), the developer, the publisher, or any other suitable factors, one advertisement may have a different format than another advertisement. For example, in an application that is focused on images, an advertisement may be primarily an image with a very limited amount of text. In contrast, if an application is focused on short text messages, the size of an advertisement may be much smaller—such as the same size as the short text messages. The stream (115) and ads (120) are addressed in more detail in FIGS. 2A and 2B.

Figure 2A:
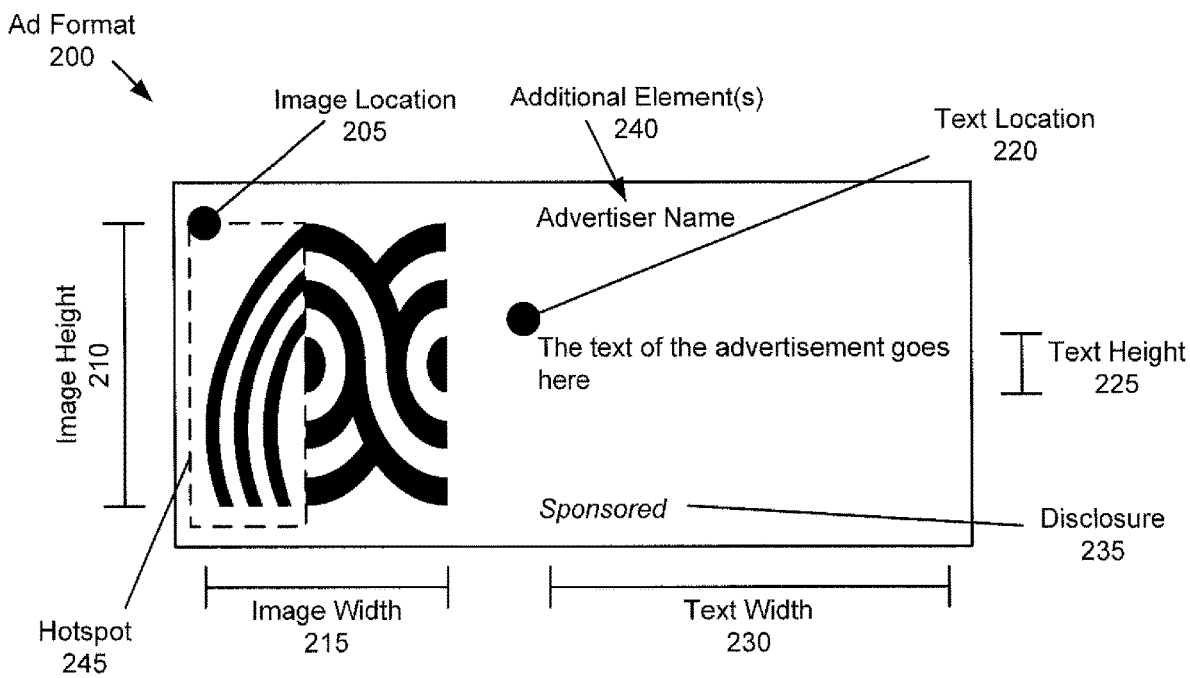
FIG. 2A shows a depiction of an advertisement in accordance with one or more embodiments of the invention.

Referring to FIG. 2A, FIG. 2A shows an advertisement in accordance with one or more embodiments of the invention. Specifically, the ad format (200) is shown. The ad format (200) is a standard set by the developer of an application. Alternatively, the ad format (200) may be set by another suitable entity, such as a publisher of the advertisement. The ad format (200) enables a publisher that wants to show an advertisement to understand the format in which the advertisement will be displayed. In one or more embodiments, an ad format (200) may be specific to a given application, or even a specific use of said application. The ad format (200) includes image location (205), image height (210), image width (215), text location (220), text height (225), text width (230), disclosure (235), additional elements (240), and hot spot (245). Each of these elements may be specified by the developer or other suitable entity, and may vary wildly from one application to another, or even from one usage of an application to another usage of the same application.

In one or more embodiments, the advertisement may include an image. The image may be in any suitable format. In one or more embodiments, the image may be a graphics interchange format (.gif), video, or other format rather than a static image. Image location (205) specifies a location where an image associated with the advertisement (120) may be located. The image is also associated with other information, or limitations—image height (210) and image width (215). Image height (210) specifies the height of the image for the given ad format (200), while image width specifies the width of the image for the given ad format (200). The image height (210) and image width (215) may be measured by any suitable standard such as pixels, inches, centimeters, etc. Optionally, there may be more than one image in a single advertisement, in which case there would also be multiple image locations, image heights, and image widths.

In one or more embodiments, the advertisement may include text. Text location (220) specifies a location where text associated with the advertisement (120) may be located. The text is also associated with other information, or limitations—text height (225) and text width (230). Text height (225) specifies the height of the text for the given ad format (200), while text width (230) specifies the width of the text for the given ad format (200). The text height (225) and text width (230) may be measured by any suitable standard such as pixels, inches, centimeters, etc. Optionally, there may be more than one text area in a single advertisement, in which case there would also be multiple text locations, text heights, and text widths.

In one or more embodiments, disclosure (235) is text that indicates that the nearby text, images, or other items are an advertisement. This may be required by the application or by another entity in order for the user to distinguish the ad from other content in their stream. Alternatively, in one or more embodiments, disclosure (235) may be an image, video, audio, or any combination thereof.

In one or more embodiments, there may be additional element(s) (240) included in the ad format (200). Additional element(s) (240) may be any additional option or limitation available for the presentation of an advertisement. For example, additional element(s) (240) may include, but are not limited to: a poll, a survey, an advertiser name, additional image options, additional text options, videos, audio, content tagging, or any other content that may be included in an advertisement.

In one or more embodiments, hotspot (245) may be a portion of the image that is more important than other portions of the image. For example, if an image contains a logo of a company surrounded by other objects, then the logo may be the hotspot (245). By specifying a hotspot (245), if the image needs to be cropped, rotated, resized, or otherwise altered, the hotspot (245) may be prioritized for preservation, either in part or whole, so that (in this example) the company logo is preserved, while the superfluous content may be removed. Hotspot (245) may be of any suitable size or sizes, and may be located on any part of an image. For example, the hotspot (245) may be located in a central portion of the image. Alternatively, the hotspot (245) may be located not in a central portion of the image. Additional details related to using the hotspot for resizing or scaling the image are described below.

Figure 2B:
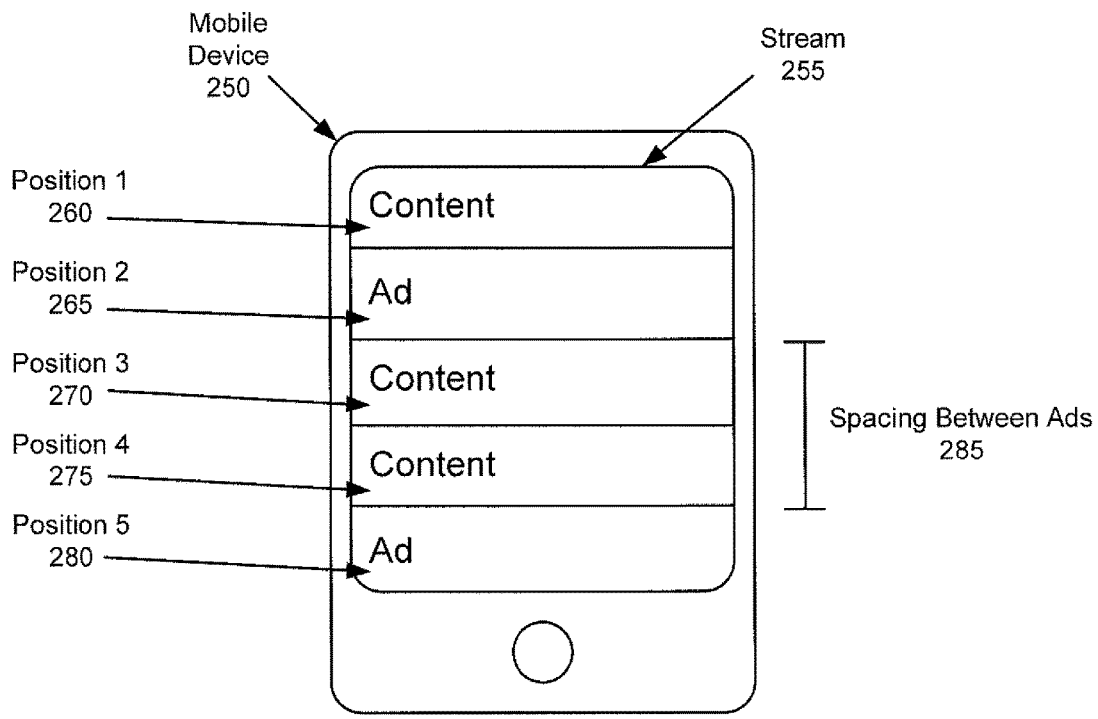
FIG. 2B shows a depiction of stream in accordance with one or more embodiments of the invention.

Referring to FIG. 2B, FIG. 2B shows a user interface of a mobile device (250) that includes stream (255) The mobile device (250) may be, for example, a smartphone. Stream (255) is shown on a display of mobile device (250). Within a stream (255) there are different positions (i.e., position 1 (260), position 2 (265), position 3 (270), position 4 (275), and/or position 5 (280)) where items may be located, such as content or advertisements. Content is items displayed, such as messages, images, or other things associated with the application that is displaying/generating stream (255). Specifically, in the stream shown in FIG. 2B, the content items are located in position 1 (260), position 3 (270), and position 4 (275). Stream (255) also includes advertisements. Specifically, the advertisements are native advertisements and look similar to the content items included in stream (255). In the stream shown in FIG. 2B, the advertisements are located at position 2 (265) and position 5 (280). The positions of content and the positions of advertisements may be set by a developer, publisher, or other suitable entity. The specifics of when and where advertisements may be shown are discussed in further detail, below.

In one or more embodiments, the spacing between ads (285) is the number of positions between advertisements. If there is too much space between ads, then a given application and/or stream may not be monetized to the most efficient level. Alternatively, too little space between ads may drive users away from using the application and/or stream and result in a less effective monetization scheme. Spacing between ads (285) is one factor of many that may be controlled by the developer, publisher, or other suitable entity, and is discussed in more detail, below.

Returning to FIG. 1, in one or more embodiments, software development kit (SDK) (125) is a set of software development tools that allow the deployment of advertisements using the method and system of this invention. The SDK (125) may easily be incorporated into the code, libraries, or other suitable portion of an application by the developer, thereby enabling the developer to easily access the functionalities described herein. SDK (125) may support developers creating application in a variety of different formats, operating systems, or other standards. Specifically, SDK (125) may include functionality to operate with any format, operating system, or other standard now known or later developed. Further, SDK (125) may enable a developer to easily access functionalities associated with ad placer (135), content selector (140), image resizer (150), and/or any other functionality included in the present invention. Because of the closely related nature of the functionalities of SDK (125) and other components of the invention, SDK (125) will be discussed in more detail in conjunction with other components of the invention.

In one or more embodiments, when the publisher is a website, the functionality of the SDK (125) may be implemented using a Hypertext Markup Language (HTML)+ JavaScript tag implementation. In one or more embodiments, a HTML tag may be inserted into the webpage that acts similar to the SDK. The HTML tag causes some JavaScript (or other execute code) to be downloaded and executed by the web browser that is displaying the website the end user of the device. The JavaScript is able to parse the HTML code of the website and identify additional HTML tags that identify information about the advertisement(s) such as ad location(s), image location(s), image width(s) and/or height(s), text placement(s), text width(s) and/or height(s), etc. The HTML and/or JavaScript embodiments may be implemented in any manner now known or later developed, and should not be limited to the above example.

In one or more embodiments, ad server (130) may be any suitable computing device or devices, such as a server, rack, mainframe, desktop Personal Computer (PC), laptop, Personal Digital Assistant (PDA), telephone, mobile phone, kiosk, cable box, and any other device. Ad server (130) is communicatively connected to image processing server (145), data store (155), developer device (160), and/or publisher device (165) via wired and/or wireless communications using any suitable communication standard, such as WiFi, the Internet, cellular data, etc. In one or more embodiments, ad server (130), image processing server (145), and/or data store (155) may be implemented on a single computing device, rather than on separate computing devices as depicted in FIG. 1. Alternatively, ad server (130), image processing server (145), and/or data store (155) may be implemented on separate computing devices. Further still, ad server (130), image processing server (145), and/or data store (155) may be implemented in separate virtual machines on a single device, or on any combination of the above methods, or any other suitable implementation. Ad server (130) includes ad placer (135), content selector (140), and ad dashboard (170).

In one or more embodiments, ad dashboard (170) includes functionality for building an advertisement. Ad dashboard (170) is an application that executes on ad server (130). Alternatively, ad dashboard (170) may be implemented on a computing device separate from ad server (130), such as a separate server. Specifically, ad dashboard (170) includes functionality to receive various components of the advertisement from a publisher, developer, and/or other suitable entity, and create the advertisement. Specifically, an image or images may be received, as well as various text variations (i.e., a short text variant, a long text variant, etc.), audio, video, and/or any other element of an advertisement may be received in any format now known or later developed. The specific location of items within an advertisement, and many other elements, may not be specified at the time the advertisement is built. Rather, those other elements may be determined at the time the advertisement is sent to a client device, at the time the advertisement is rendered, or at any other suitable time. In one or more embodiments, the specifics of location, etc., are not included because the publisher, developer, or other entity may not know the exact advertisement format details at the time the advertisement is built.

In one or more embodiments, ad placer (135) is an application and/or module executing on ad server (130) for placing advertisements in a stream (e.g., content at position 1, advertisement at position 2, content at position 3 etc. . . . ). Specifically, the ad placer (135) includes functionality for refreshing and/or caching advertisements, placing a single advertisement, placing multiple advertisements, placing advertisements of multiple formats, placing advertisements in sections, placing advertisements related to the content of the stream, gathering ad metrics, previewing advertisements, and other functionalities needed by the invention. Some, or all, of the functionality discussed with regards to ad placer (135) may be performed on or by client device (105) via the functionalities included in SDK (125).

In one or more embodiments, ad placer (135) includes functionality for refreshing and/or caching advertisements. Specifically, refreshing and/or caching advertisements refers to controlling what advertisements are sent to, or stored on, client device (105), and when those advertisements are inserted into a stream and displayed to a user. In one or more embodiments, ad placer (135) may respond to requests from a client device for more advertisements as discussed below with regards to placement of any type of advertisements.

In one or more embodiments, with regards to the caching of advertisements, many of the functionalities may be implemented on client device (105) via SDK (125). Specifically, the ad placer (135) (and/or SDK (125)) may set a hard cap on the number of advertisements that may be stored on a client device at any given moment, such as 1, 3, 5, or any other suitable number. Alternatively, the size of the cache may automatically adjust to (or the hard cap may be set based on) the particular usage patterns exhibited by the user and/or settings of the publisher, such as scroll speed, advertisement frequency, size of advertisements, size of content items in the stream, fill rate, etc. The cache may function as a queue, and advertisement may be removed from the cache in any suitable manner. In one or more embodiments, when a client device receives an advertisement, an expiration timer may be set for the advertisement, such that after a time period, the advertisement is stale and will no longer be shown to a user. A publisher may not be charged for a stale advertisement, as a user never viewed the advertisement. The expiration timer may be of any suitable length, such as 5 minutes, 10 minutes, etc. Upon expiration of an advertisement, SDK (125) may immediately (or within a certain preset time limit) request additional advertisements from the ad placer. Alternatively, the SDK (125) may wait to refresh the expired advertisement. For example, the SDK (125) may wait until the number of advertisements in the cache falls below a certain level.

In one or more embodiments, ad placer (135) includes functionality for placing a single advertisement. Said another way, the ad placer (135) includes functionality to place individual advertisements within specific positions within a stream. The advertisement may be placed, for example, in a specific position within a stream, such as the first position, the 5$^{th}$, the 12$^{th}$, etc. The particular position may be pre-determined by any suitable entity, such as a developer and/or publisher. The publisher and/or developer may indicate, via a web interface or other suitable user interface, where he or she would like advertisements to appear. For example, a publisher may indicate that an advertisement should be placed at positions 3, 15, and 20 within a stream. In one or more embodiments, the advertisements may be set to repeat at a given frequency (i.e., every 10 positions, etc.) although the particular ad that is displayed may change. Additionally, or alternatively, the publisher and/or developer may specify spacing between advertisements (i.e., first advertisement at position 3, with 5 positions between advertisements).

In one or more embodiments, ad placer (135) and a client device may communicate regarding the placement of advertisements using a variety of functions, methods, queries, etc. For example, an ad request may return a collection of ad data (such as formatting information, image information, text content, etc.), which in one or more embodiments, may sometimes be empty. In one or more embodiments, the ad request may return a URL for an image to be used in the advertisement. The URL may be partially complete. Specifically, the URL may have aspects that need to be completed (or otherwise provided) by the SDK or other suitable components. For example, the provided URL to an image may be "http://www.abcimages.com/adimageXXXxXXX-.image" where the "XXXxXXX.image" portion of the URL represents the desired size of the image. Thus, the SDK or other suitable element may process the URL to specify the desired size of the image for the advertisement, and the resulting URL may look like: "http://www.abcimages.com/ adimage200x300.image." The URL may be processed to include any type or amount of information. A position request may return a collection of positions where advertisements should be placed. Optionally, the above to requests may be combined, such that ad positioning information is included with a collection of ad data. Various other tokens, objects, etc., may also be exchanged between the ad placer (135) and a client device. The responses may be sent and/or returned in any format, such as a JavaScript Object Notation (JSON) object.

In one or more embodiments, ad placer (135) includes functionality to place advertisements of multiple formats. The advertisements may be of any specified form, such as image, text, audio, video, some combination of the above, or any other suitable form. The publisher and/or developer may specify the format of a given advertisement for a given position(s). For example, a video advertisement may be placed every 15 positions while a text advertisement may be placed every 3 positions. In one or more embodiments, the format of an advertisement may be specified at the same time the advertisement positioning is set by the publisher and/or developer, or may be set at any other suitable time.

In one or more embodiments, ad placer (135) includes functionality to placing advertisements in sections. The sections refer to the formats used by operating systems for mobile devices. Ad placer (135) includes functionalities for interfacing and/or placing advertisements for any operating system, using any standard or method now known or later developed.

In one or more embodiments, ad placer (135) includes functionality to place advertisements related to the content of the stream. The SDK (125) may include functionality to determine the subject matter of the stream, either generally or at a high level of specificity. With this knowledge, when the publisher has indicated that he or she would like to place advertisements next to related content, the SDK (125) is able to override the positioning information set by the ad placer (135) and instead set the position of an ad such that the ad is next to a related content item.

In one or more embodiments, ad placer (135) includes functionality to gather metrics related to the advertisements placed into the stream. The metrics are gathered on and/or by the client device (105) (i.e., using functionality provided by SDK (125)). The metrics may include any information able to be tracked including, but not limited to: impressions, clicks, requests, number of ads displayed, user scroll speed, user time spent per viewing a content item, user time spent viewing an advertisement, and/or other activities performed by the user related to an advertisement or a stream where an advertisement may be placed. In one or more embodiments, the metrics may be gathered on a per-position basis. That is, if the same ad is displayed to two groups of users: group 1 and group 2, where group 1 has the ad displayed at position 3 of the stream, while group 2 has the ad displayed at position 13 of the stream, then there would be two separate sets of information gathered on the users. This high level of detail allows publisher to ensure the effectiveness of their advertisements. Alternatively, since the same ad was shown at two different positions (in the above example), the metrics gathered from both positions may also be combined.

In one or more embodiments, ad placer (135) includes functionality to preview an advertisement. Ad placer (135) may utilize metrics gathered from advertisements placed into the streams of various applications to enable the preview. Specifically, after an ad has been rendered, SDK (125) includes functionality to traverse through an ad view hierarchy and serializes the resulting ad view information. This serialized ad view information is sent to ad server (135), which stores the information. Ad placer (135) may then use the serialized ad view information to preview an ad for a publisher (i.e., publisher device (165)). See also, FIGS. 9A-9C.

In one or more embodiments, content selector (140) includes functionality for selecting which variation (when available) of content will appear in a native ad. The content selector (140) is able to select from many different types of content, such as images, text, etc. In one or more embodiments, content selector (140) determines the largest text variant that fits within the available space of a given ad format. Thus, if the ad format has a text width and height of 200 pixels by 300 pixels, then content selector (140) is able to select a text variant that fits within the ad format. Content selector (140) may select the largest text variant that fits. Alternatively, content selector (140) may select the second largest text variant that fits, or any other suitable variant. In one or more embodiments, content selector (140) may adjust the selected text variant by, for example, changing font size, changing the font type, or making other changes that affect the size of the text variant, to ensure that the selected text variant properly fits within the ad format. Further still, content selector (140) includes functionality to alter the text itself. For example, content selector (140) may cut some text short and only display part of the text, while adding ellipses ( . . . ) to indicate that text has been cut off and that a user could, for example, click the advertisement to see the rest of the text. Alternatively, content selector (140) may include functionality to summarize the content of the text to reduce the overall length of the text, remove "unnecessary" words to reduce the length, or any other suitable modification to alter a text variant to fit the available space. While content selector (140) has been described primarily with regards to text, one of ordinary skill in the art, having the benefit of this disclosure, will understand that content selector (140) also includes functionality for selecting or modifying content beyond text and, as such, the invention should not be limited to the above examples.

In one or more embodiments, image processing server (145) may be any suitable computing device or devices, such as a server, rack, mainframe, desktop Personal Computer (PC), laptop, Personal Digital Assistant (PDA), telephone, mobile phone, kiosk, cable box, and any other device. Image processing server (145) is communicatively connected to ad server (130) and/or data store (155) via wired and/or wireless communications using any suitable communication standard, such as WiFi, the Internet, cellular data, etc. In one or more embodiments, ad server (130), image processing server (145), and/or data store (155) may be implemented on a single computing device, rather than on separate computing devices as depicted in FIG. 1. Alternatively, image processing server (145), ad server (130), and/or data store (155) may be implemented on separate computing devices. Image processing server (145) includes image resizer (150).

In one or more embodiments, image resizer (150) is an application or module executing on image processing server (145). Image resizer (150) includes functionality to resize, adjust, or otherwise edit images for advertisements. In one or more embodiments, some, or all, of the functionality of image resizer (150) may be included in SDK (125), and performed on client device (105), rather than on image processing server (145). Image resizer (150) includes functionality to scale, crop, or letterbox an image. In one or more embodiments, image resizer (150) receives an image in the form of a link to a location in data store (155). Image resizer (150) includes functionality to retrieve the image from data store (155). Alternatively, the image may be provided along with the request sent to image resizer (150). Additional information may be included along with the request, such as the target width and height for the image, height and width of the hotspot (if any), coordinates of where the hotspot is (if any), or other suitable information related to the image or resizing of the image. In one or more embodiments, image resizer (150) includes functionality to determine when to crop, scale, or letterbox an image based on any available information.

In one or more embodiments, when image resizer (150) is cropping an image, the image may be scaled down to the target size. If there is a hotspot, the hotspot may be the determining factor—that is, the hotspot may be scaled until the hotspot fits within the target. Subsequently, the image may be translated such that the hotspot is centered within the target, and all of the remaining portions of the image outside of the target are cropped.

In one or more embodiments, when image resizer (150) is scaling an image, the image may be scaled in one dimension (i.e., width or height) until the hotspot fits inside the target box. Then, the image may be translated until the hotspot fits in the target, and is centered if possible. Then, all of the remaining image outside of the target may be cropped. In one or more embodiments, when image resizer (150) is letterboxing an image, the image may be scaled in both width and height until the entire image fits within the target. Then, the extra space within the target, if there is any, may be filled with any color, such as yellow, white, black, etc.

In one or more embodiments, data store (155) is a database, hard drive, server, cloud, or other suitable storage and/or computing device(s). Data store (155) may be separate from ad server (130) and/or image processing server (145) as shown in FIG. 1, or may be located on the same device or devices as ad server (130) and/or image processing server (145). Data store (155) is communicatively connected to ad server (130), image processing server (145), and/or client device (105) via wired and/or wireless communications using any suitable communication standard, such as WiFi, the Internet, cellular data, etc. In one or more embodiments, data store (155) is used to store images for advertisements. Specifically, data store (155) may store each image at a unique web address, and the image may be retrieved by the desired entity by simply accessing the web address. In such scenarios, advertisements may be sent, for example, from ad server (130) to client device (105) at a greatly reduced sized if client device (105) is able to subsequently access the image (typically the largest part of an ad, in terms of storage space needed), via a simple web address. Alternatively, the images in data store (155) may be accessed by other similar mechanisms. In one or more embodiments, data store (155) may also be used to store other large files needed for advertisements such as audio, video, etc.

In one or more embodiments, developer device (160) is a computing device used by the developer(s), or creator(s), of application (110). Developer device (160) may be any computing device including, but not limited to: smart phones, laptop computers, desktop computers, tablets, etc. Developer device (160) may have various software development tools and applications installed (not shown), so that the developer may create application (110). In one or more embodiments, developer device (160) may also have an SDK (not shown) installed, so that the functionalities of SDK (125) are also available to the developer for inclusion in their application, for testing, or for any other suitable use. Developer device (160) is communicatively connected with ad server (130) using a wired and/or wired connection, over any suitable medium, such as the Internet. As indicated by the dotted line, developer device (160) may optionally be communicatively connected with application (110) of client device (105).

In one or more embodiments, publisher device (165) is a computing device used by the publisher of advertisements. Publisher device (165) may be any computing device including, but not limited to: smart phones, laptop computers, desktop computers, tablets, etc. Publisher device (165) is communicatively connected with ad server (130) using a wired and/or wired connection, over any suitable medium, such as the Internet. Publisher device (165) includes functionalities to connect with ad dashboard (170) for the building and preview of, advertisements using, for example, a web browser or other suitable application. Optionally, publisher device (165) may include functionalities to connect with ad server (130) and/or any other suitable device. In one or more embodiments, the application used by publisher device (165) to access ad dashboard (170) may be a custom application or module.

Figure 3:
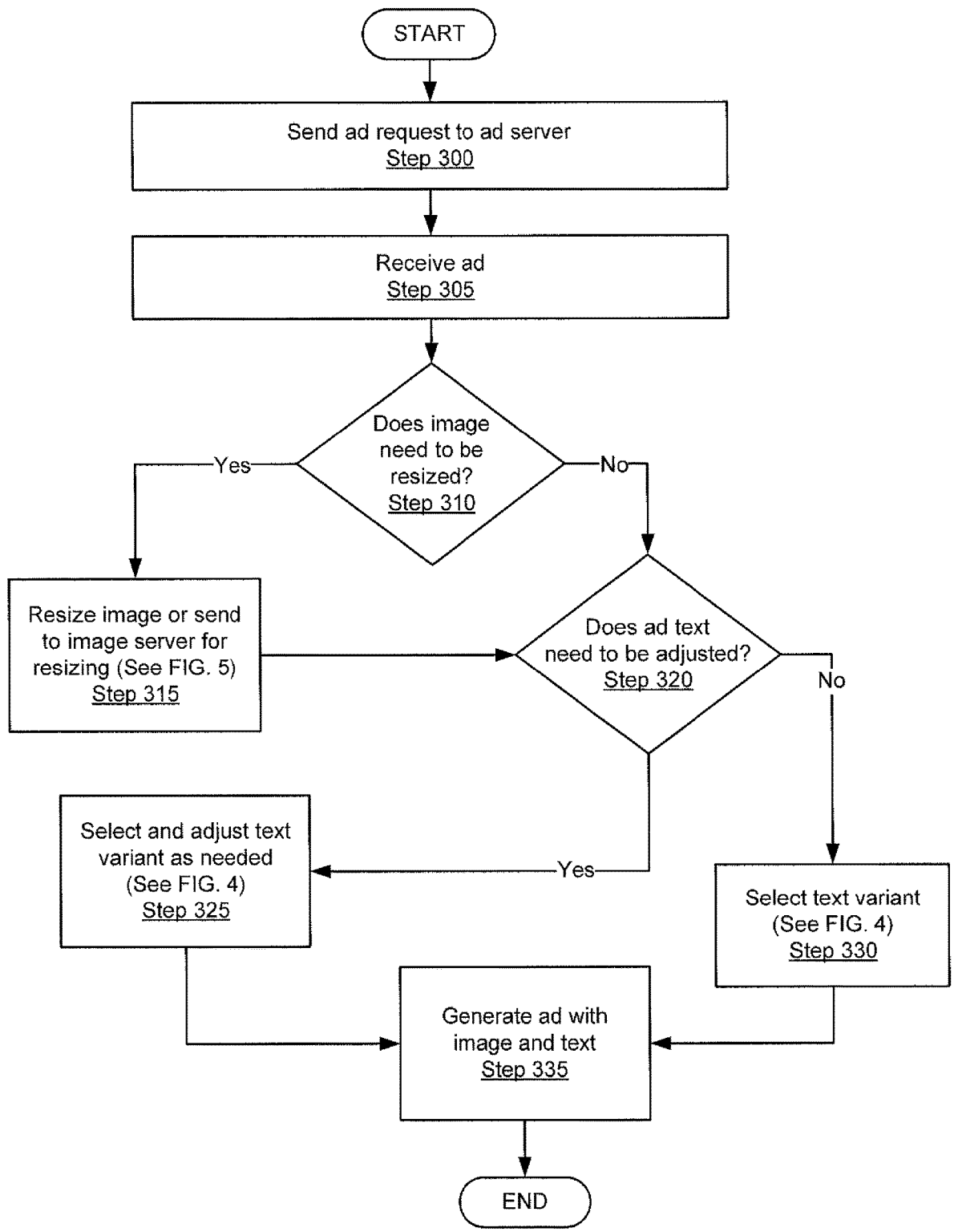
FIG. 3 shows a flowchart in accordance with one or more embodiments of the invention.

FIG. 3 shows a flowchart of a method, in accordance with various embodiments of the invention. More specifically, FIG. 3 shows a method for processing an ad request in accordance with one or more embodiments of the invention. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 3 should not be construed as limiting the scope of the invention.

In Step 300, an ad request is sent to an ad server. The ad request may be sent, for example, from a client device to the ad server. The request may be to refresh an advertisement cache, or for immediate placement of ads within a stream, or for any other suitable reason. The request may be formatted in any manner now known or later developed.

In Step 305, an ad is received. The ad may be received by a client device from an ad server in any manner now known or later developed. In one or more embodiments, the ad includes one or more of the following elements (also referred to as ad properties): a link (such as a Uniform Resource Locator (URL)) for the image (or audio, video, etc.), data about the hotspot (location, height, width, etc.), a short text variant, a medium text variant, a long text variant, an advertiser name, a disclosure, etc. In one embodiment of the invention, the ad may include the image instead of the URL referencing the image.

In Step 310, a determination is made whether the image needs to be resized. Optionally, this determination may be made before Step 305. In other words, the ad server, or other suitable component, may determine whether the image needs resizing before sending the image to the client device. Alternatively, the determination may be made by a client device. The determination may be based on any suitable factors, such as the size of the image, the size of the advertisement, the available space for an image in the advertisement, etc. If the image does not need to be resized, then the process proceeds to Step 320; otherwise, the process proceeds to Step 315.

In Step 315, the image is resized locally or is sent to an image processing server for resizing. If the image is to be sent to an image processing server, then the image (if one has been obtained from the ad server) or a URL referencing the image (if one has been obtained from the ad server) is sent the image processing server. Alternatively, the resizing may be performed on the client device. This step is discussed in more detail in FIG. 5.

In Step 320, a determination is made whether advertisement text needs to be adjusted. The determination may be based on any suitable information, such as the availability of text variants, the size of the advertisement, the size of the text box or boxes in the advertisement, etc. As in Step 310, this step may be performed before Step 305. In other words, the ad server, or other suitable component, may determine whether the text needs to be adjusted before sending the ad to the client device. In such cases, the appropriately sized text may be sent to the client device instead of the client receiving a short text variant, a medium text variant, and a long text variant. If the ad text does not need to be adjusted (i.e., the properly sized text was obtained from the ad server) then the process proceeds to step 335; otherwise the process proceeds to step 325.

In Step 325, advertising text is selected and adjusted as needed. The text variant may be selected and/or adjusted in a variety of ways, which are described in more detail in FIG. 4.

In Step 330, a text variant is selected, in accordance with one or more embodiments. Step 330 is performed when one of the text variants provided by the ad server fits the text width (230) and text height (225) of the ad format for the client device. In such cases, the selected text variant is not adjusted. Those skilled in the art will appreciate that step 320 may not be performed if a properly sized ad text is received from the ad server.

In Step 335, an ad is generated with the appropriate image and text, in accordance with one or more embodiments. The ad may be generated, or rendered, on the client device with the appropriately sized image and text in any manner now known or later developed. Once rendered, metrics may be gathered about the success (or failure) of the advertisement, such as impressions, click through, user usage of the stream the advertisement is placed in, etc.

In one embodiment of the invention, once the text for the ad has been determined, the text for the ad may be rendered on the client device. For example, the text portion of the advertisement may be rendered on the client device even though the resized image has not been received from the image processing server or the process on the client device that is resizing the image has not completed the resizing process. In such cases, the image location in the ad, i.e., the location where the resized image is to be displayed, may include a placeholder image, until the resized image is displayed. The placeholder image corresponds to an image that indicates to the user of the client device that the resized image is to be displayed in place of the placeholder image but that such image has not yet been rendered.

It will be apparent to one of ordinary skill in the art that FIG. 3 provides a very high level view of the methods involved in the present invention. Many of the methods briefly mentioned in FIG. 3 are discussed in more detail in the later figures.

Figure 4:
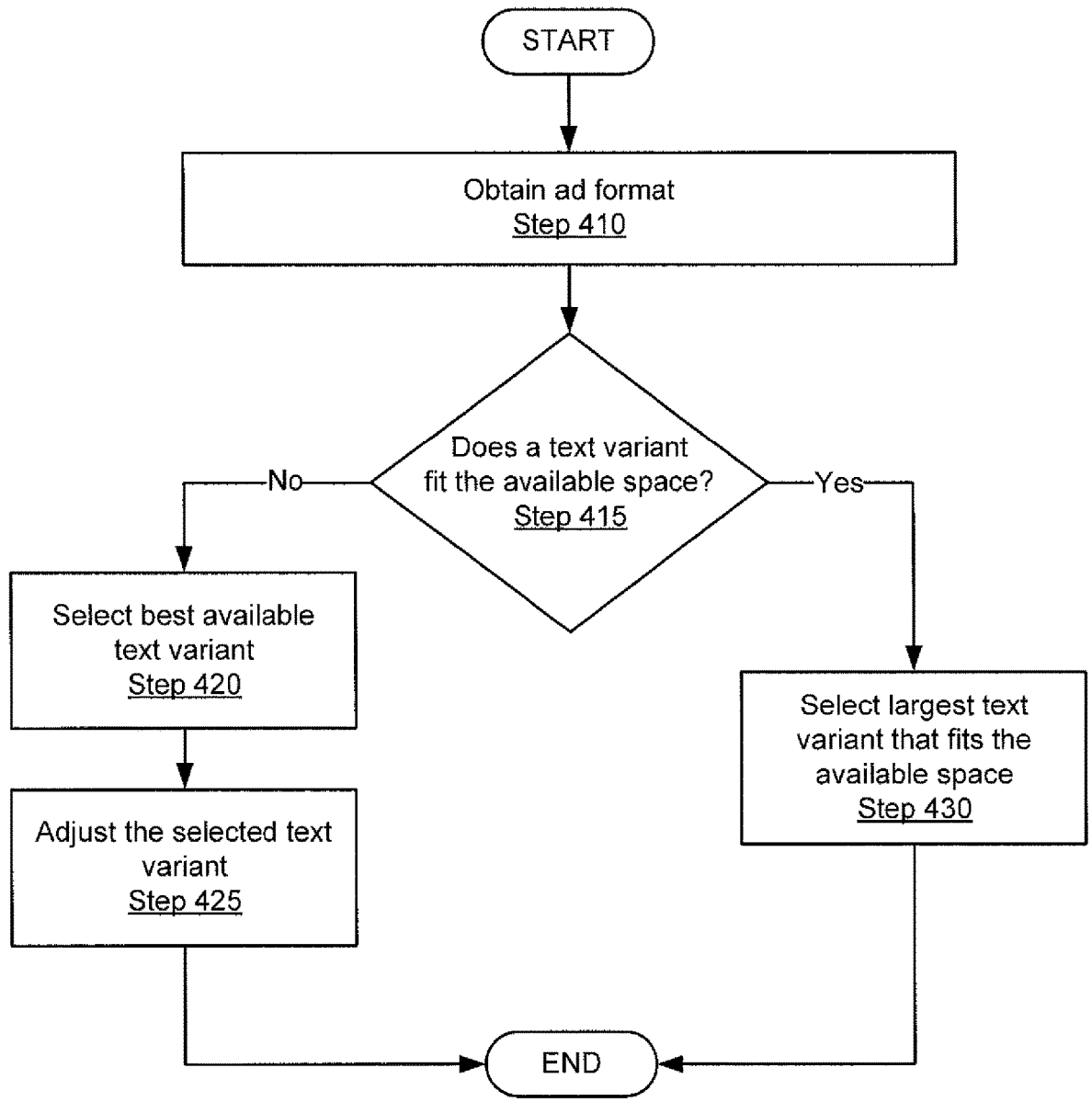
FIG. 4 shows a flowchart for content selection in accordance with one or more embodiments of the invention.

FIG. 4 shows a flowchart of a method for content selection, in accordance with various embodiments of the invention. More specifically, FIG. 4 shows a method for determining an appropriate text variant and/or adjusting text for an ad in accordance with one or more embodiments of the invention. The "text variant" may also be referred to as "text option" or other suitable term. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 4 should not be construed as limiting the scope of the invention.

In Step 410, an ad format is obtained. The format is obtained in any manner now known or later developed. Specifically, the ad format is known to the application in which the advertisement will appear, and may be obtained from the application or other suitable source. The format may be obtained, for instance, by an SDK.

In Step 415, a determination is made whether a text variant fits in the available space (as specified in the ad format). The determination may be based on any suitable factors, such as the available text width and/or height for the advertisement, the sizes of the available text variants, the effect of various font sizes or fonts, etc. If a text variant fits within the available text width and height for the advertisement, then the method proceeds to Step 435. If a text variant does not fit within the available text width and height for the advertisement, then the method proceeds to Step 420.

In Step 420, the best available text variant is selected. The best available text variant may be, for example, the smallest available text variant (i.e., the text variant with the least excess text), or may be any other available text variant. The text variant may be selected in any manner now known or later developed.

In Step 425, the selected text variant is adjusted. The text variant may be adjusted in any suitable manner, such as truncating the text such that it fits in the text location within the ad, inserting an ellipses ( . . . ) to indicate that there is additional text if the user clicks the advertisement, summarizing the text to shorten the text, removing excess words or other words, etc. Alternatively, or in addition to the above adjustments, the selected text variant may have a text size, text font, spacing and/or other aspect adjusted. It will be apparent to one of ordinary skill in the art, having the benefit of this disclosure, that there are many ways to shorten text in an attempt to make the text fit within a specified size and, as such, the invention should not be limited to the above examples.

In Step 430 the largest text variant that fits in the available space is selected, in accordance with one or more embodiments. The largest text variant may be selected by any suitable method now known or later developed. Alternatively, a text variant other than the largest text variant that fits may be selected.

Any, or all, of the steps of FIG. 4 may be performed on an ad server. Alternatively, any, or all, of the steps of FIG. 4 may be performed on a client device. Further still, the steps of FIG. 4 may be performed by some combination of an ad server and a client device. The determination as to whether an ad server or a client device should perform a given step of FIG. 4 may be made by either device at any time, and for any suitable reason. An example showing one or more embodiments of FIG. 4 is included below in FIG. 8.

Figure 5:
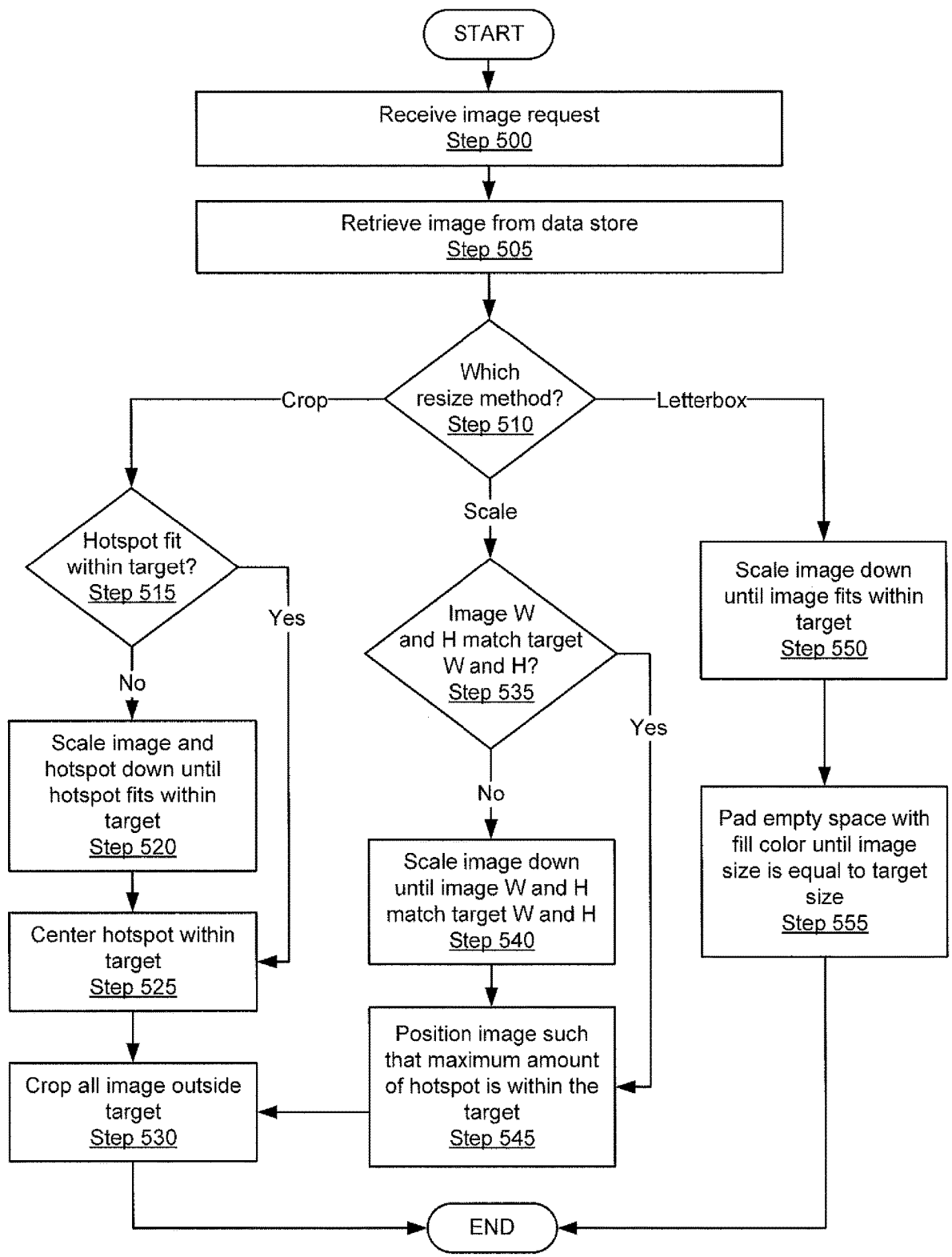
FIG. 5 shows a flowchart for image resizing in accordance with one or more embodiments of the invention.

FIG. 5 shows a flowchart of a method for image resizing, in accordance with various embodiments of the invention. More specifically, FIG. 5 shows a method for resizing the image in accordance with one or more embodiments of the invention. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 5 should not be construed as limiting the scope of the invention.

In Step 500, an image request is received. The image request may include, but is not limited to, image width, image height, format, hotspot dimensions, proposed resize method, the image (or a URL to a location of the image). The image request may be received in any manner now known or later developed. The request may be received by an image processing server, or other suitable component. In one or more embodiments, Step 500 may not be performed. For example, Step 500 may not be performed when the image processing will be performed on the client device, rather than on an image processing server.

In Step 505, an image is retrieved from a data store. The image may be retrieved from the data store in any manner now known or later developed. In one or more embodiments, the image is retrieved from the data store using a URL (or other link) that was included in the image request. The image may be stored in any format now known or later developed.

In Step 510, a determination is made regarding which resize method should be used. The determination may be based on any available information such as the width and/or height of the advertisement, the format of the image, the quality of the image, the width and/or height of the image, the presence or absence of a hotspot, the width and/or height of the hotspot, a publisher preference, and/or any other suitable factor. In one embodiment of the invention, the determination in step 510 is based on the information received in the image request. Further, the determination in step 510 may be based on the resize method included in the image request. For example, if the image request specified the resize method as crop, then the result of step 510 would be to proceed to step 515.

Continuing with the discussion of Step 510, if the resize method is letterbox, the method proceeds to Step 550. If the resize method is scale, the method proceeds to Step 535. If the resize method is crop, the method proceeds to Step 515.

In Step 515, a determination is made whether the hotspot fits within the target (i.e., an area specified by the image height and image width in the corresponding ad format). The determination may be made in any manner now known or later developed. For example, the determination may be based on the height and width of the target in comparison to the height and width of the hotspot. If the hotspot fits within the target, the method proceeds to Step 525. If the hotspot does not fit within the target, the method proceeds to Step 520.

In Step 520, the image and hotspot are scaled down until the hotspot fits within the target. The image and/or hotspot may be scaled in any manner now known or later developed. The image and/or hotspot may be scaled proportionally. Alternatively, the image and/or hotspot may be scaled disproportionally.

In Step 525, the hotspot is centered within the target. The hotspot may be centered within the target in any manner now known or later developed, such as performing a translation, or other suitable method.

In Step 530, all portions of the image outside of the target are cropped. The image outside of the target may be cropped in any manner now known or later developed.

If the image is to be scaled, then in Step 535, a determination is made whether the image width and height match the target width and height (i.e., the image width and image height specified in the ad format). The determination may be made in any manner now known or later developed. If the image width and height match the target width and height, then the method proceeds to Step 545. If the image width and height do not match the target width and height, then the method proceeds to Step 540.

In Step 540, the image is scaled down until the image width and height match the target width and height. The image may be scaled down to match the target width and height using any method now known or later developed.

In Step 545, the image is positioned such that a maximum amount of the hotspot is within the target. The image may be positioned using any method now known or later developed, such as performing a translation, etc. After Step 545, the method proceeds to Step 530.

If the image is to be resized using letterbox, then in Step 550, the image is scaled down until the image fits within the target. The image may be scaled down to match the target width and height using any method now known or later developed.

In Step 555, empty space is padded with a fill color until the image size is equal to the target size. The empty space may be padded with a fill color using any method now known or later developed. The fill color may be any color. In one or more embodiments, the fill color may be specified by the publisher, developer, or other suitable entity. Alternatively, the fill color may be related to a color or colors used in the advertisement, and/or a color or colors used in the content nearby the advertisement.

Any, or all, of the steps of FIG. 5 may be performed on an image processing server. Alternatively, any, or all, of the steps of FIG. 5 may be performed on a client device. Further still, the steps of FIG. 5 may be performed by some combination of an image processing server and a client device. The determination as to whether an image processing server or a client device should performed a given step of FIG. 5 may be made by either device at any time, and for any suitable reason. An example showing one or more embodiments of FIG. 5 is included below in FIG. 7.

Figure 6:
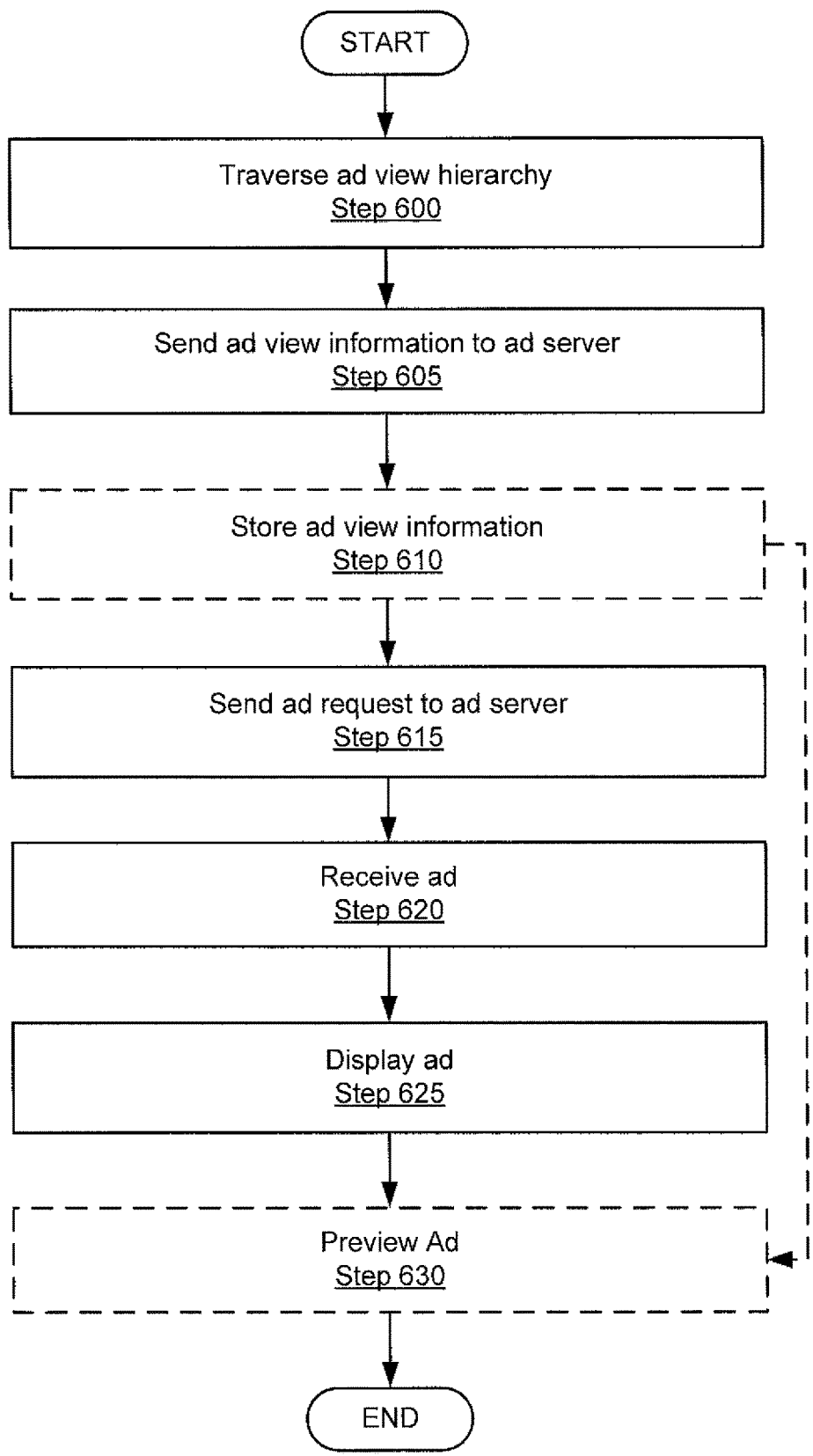
FIG. 6 shows a flowchart for previewing an advertisement in accordance with one or more embodiments of the invention.

FIG. 6 shows a flowchart of a method of previewing an advertisement, in accordance with various embodiments of the invention. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 6 should not be construed as limiting the scope of the invention.

In Step 600, an ad view hierarchy is traversed. The ad view hierarchy may be traversed by the SDK, JavaScript, or any other suitable element/component. The ad view hierarchy describes the various components within an ad and the relationship among the components. For example, a root ad view may include the entire advertisement, while an image view, title view, text view, icon view, button view, or other views may be limited to one object (or any other suitable number of objects). (See e.g., FIG. 9B).

In Step 605, ad view information is sent to the ad server. The ad view information may be sent to the ad server in any manner now known or later developed, and may be sent at any suitable time period. Additional information may also be sent to the ad server such as device size, device resolution, device type, operating system, operating system version, available processors, memory, hard drive space, etc. In one or more embodiments, the ad view information may be sent to the server at a later time, such as in Step 615, when the ad request is sent to an ad server, or at any other suitable time.

In Step 610, ad view information is stored. The ad view information may be stored, for example, using a hash based on device information that may affect the manner in which the advertisement is displayed. Additionally, the additional information described above in Step 605 may also be stored. Optionally, after the ad view information has been stored the method may proceed to Step 630 if, for example, an advertiser or other suitable entity wanted to preview an ad they were creating.

In Step 615, an ad request is sent to an ad server. This step may be performed as described in Step 300 of FIG. 3. In one embodiment of the invention, the ad request may be sent to the ad server with the ad view information.

In Step 620, an advertisement is received. This step may be performed as described in Step 305 of FIG. 3.

In Step 625, an advertisement is displayed. The advertisement may be displayed in any manner now known or later developed. Additionally, the advertisement may be displayed at any position within the stream.

In Step 630, an ad is previewed. The ad may be previewed by the publisher or other suitable entity. The ad preview is able to show the publisher exactly how their advertisement would appear within a given application on a given device. This enables the publisher to customize their advertisement to their exact specifications.

Any, or all, of the steps of FIG. 6 may be performed on an ad server. Alternatively, any, or all, of the steps of FIG. 6 may be performed on a client device. Further still, the steps of FIG. 6 may be performed by some combination of an ad server and a client device. The determination as to whether an ad server or a client device should before a given step of FIG. 6 may be made by either device at any time, and for any suitable reason. An example showing one or more embodiments of FIG. 6 is included below in FIGS. 9A-9C.

The following section describes various examples of the invention. The examples are included to aid in the understanding of the invention and are not intended to limit the scope of the invention.

Figure 7:
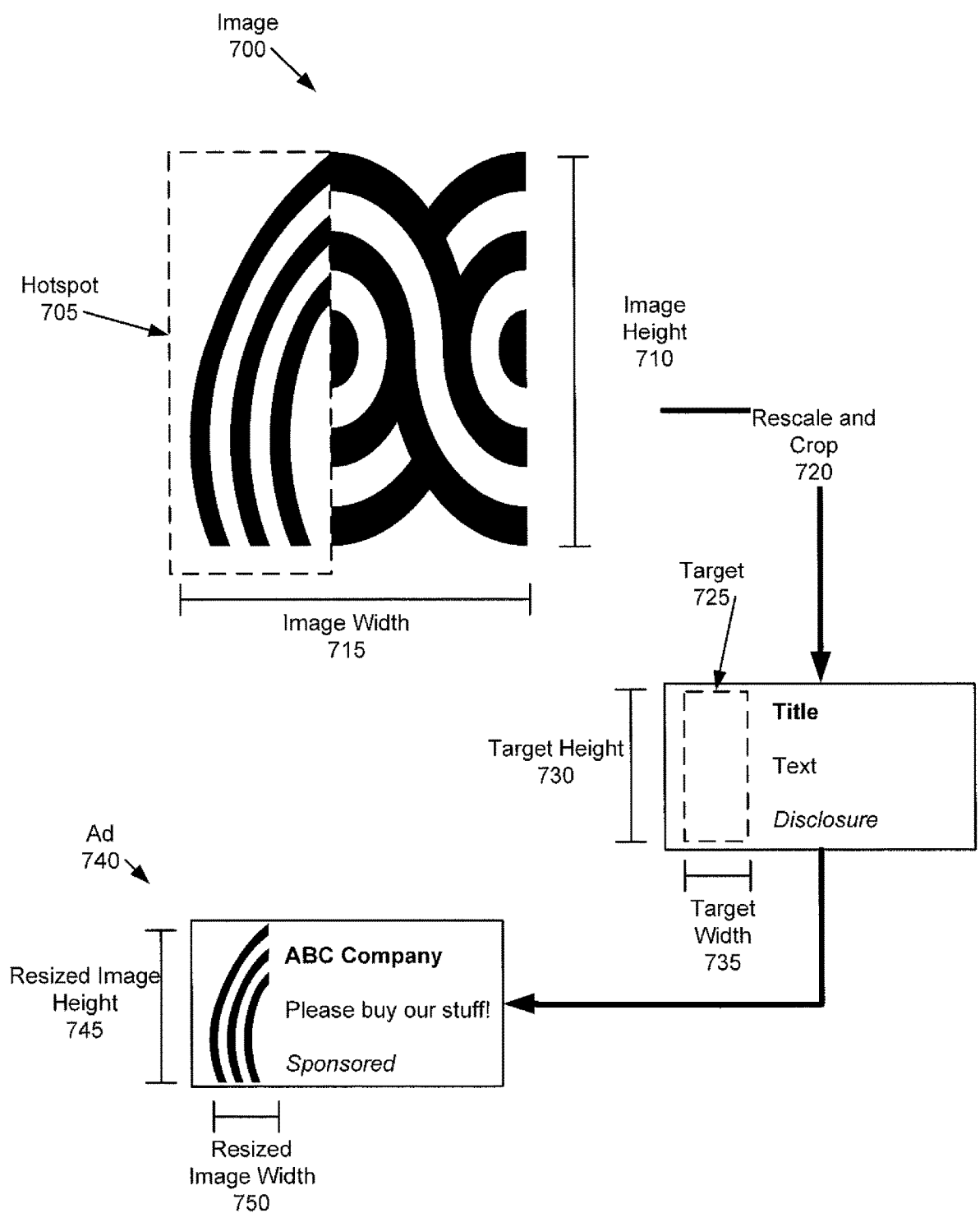
FIG. 7 shows an example of image resizing in accordance with one or more embodiments of the invention.

FIG. 7 shows an example of image resizing in accordance with one or more embodiments. Specifically, image (700) is an image for inclusion in an advertisement. A hotspot (705) has been identified as an important area of image (700) so that, in the event of image (700) needs to be resized, as much of hotspot (705) as possible would attempt to be saved (and thus displayed in an advertisement). However, the image height (710) and the image width (715) are relatively large when compared with the target (725). Specifically, target (725) has a target height (730) and target width (735) which identify how much space an image may take up in ad (740). Thus, image (700) is rescaled and cropped (720) so that image (700) is able to be displayed in ad (740). Specifically, image (700) is scaled down to such a size that hotspot (705) fits within the target (725), and the extraneous portions of image (700) are cropped. Thus, the result is that only hotspot (705) is included in ad (725). Further, the resized image height (745) and resized image width (750) are equal to target height (730) and target width (735), and are substantially less than that of image height (710) and image width (715). The resizing and cropping in this example may be performed on a client device or on an image processing server.

Figure 8:
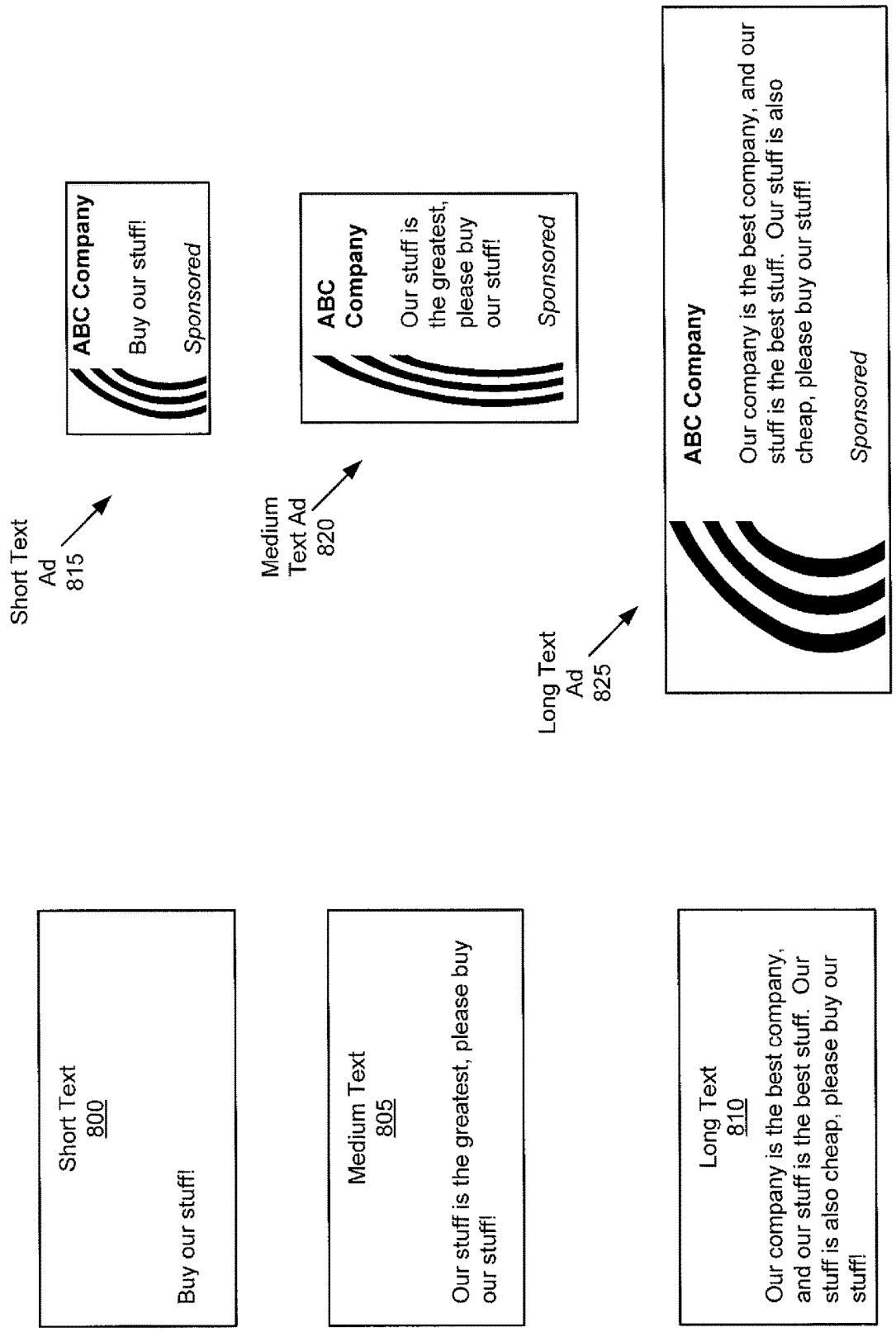
FIG. 8 shows an example of content selection in accordance with one or more embodiments of the invention.

FIG. 8 shows an example of content selection in accordance with one or more embodiments. Specifically, a publisher has created an advertisement in FIG. 8. The publisher has created a short text (800) variant of the advertisement which states, "Buy our stuff!" Additionally, a medium text (805) variant of the advertisement states, "Our stuff is the greatest, please buy our stuff!" Finally, a long text (810) variant of the advertisement states, "Our company is the best company, and our stuff is the best stuff. Our stuff is also cheap, please buy our stuff!" The length of these various text variants may be measure in any suitable form, such as pixels, centimeters, inches, etc., and may be stored in addition to storing the actual text.

Once the format of a native advertisement is known, the proper text variant may be selected. Thus, for the smallest ad, the short text ad (815) the short text (800) is used. Similarly, for a medium sized ad, (i.e., medium text ad (820)), the medium text (805) is used, while a large ad (i.e., long text ad (825)), the long text (810) is used. As another example, a larger text size than fits within the available space may be used, once modified to fit by a content selector. Thus, medium text (805) could be made to fit in short text ad (815) if short text (800) was not available. In that instance, the medium text may be modified to read "our stuff is the greatest . . . " which is of similar length to short text (800). When or if the user were to click the advertisement, the remaining text of medium text (805) may be displayed.

Figure 9A:
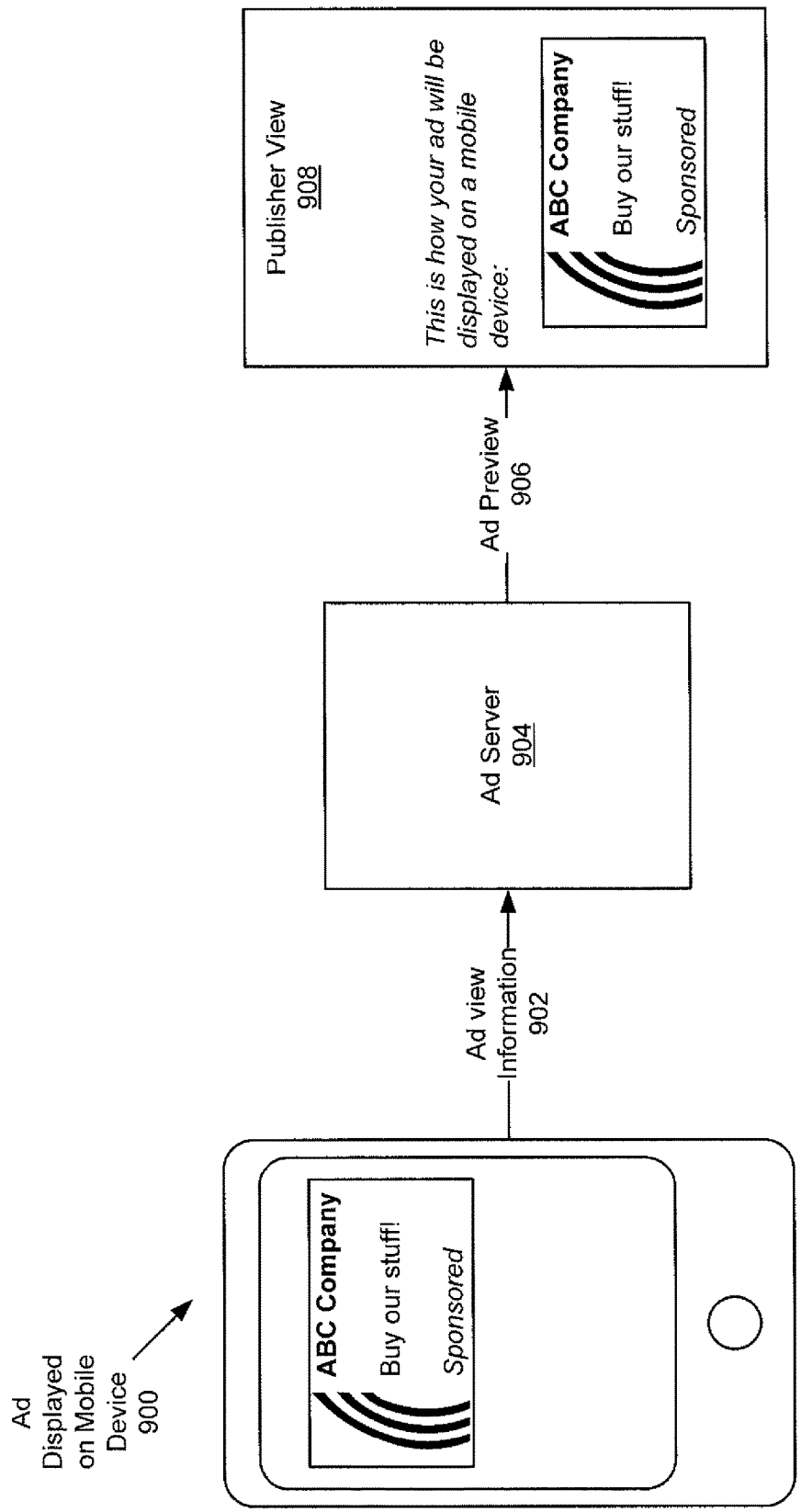
Figure 9B:
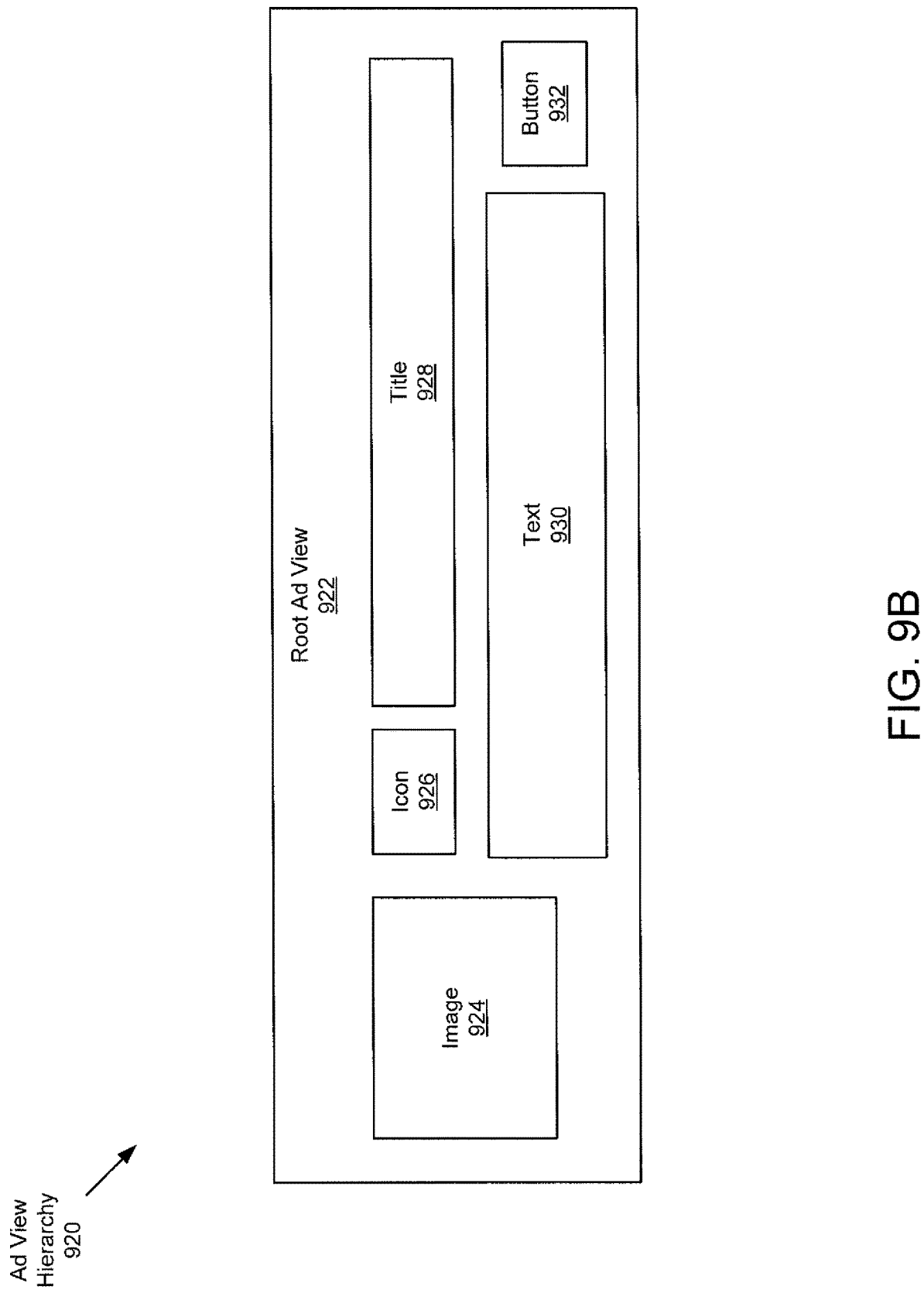

FIGS. 9A, 9B, and 9C show examples of previewing advertisements. Beginning with FIG. 9A, an ad is displayed on a mobile device (900). The ad appears as a native advertisement in a stream. The SDK on the mobile device traverses through the ad view hierarchy and gather ad view information, which is subsequently sent (902) to ad server (904). The ad server (904) stores this ad view information, so that publisher may use the information to receive accurate previews of ads as they build them. Thus, when a publisher requests a preview of an ad, the ad preview (906) is sent to the publisher's device, and the publisher is able to view (908) their advertisement exactly as it would be displayed on mobile device (900).

In FIG. 9B, an ad view hierarchy (920) is shown. Specifically, a root ad view (922) is shown. Root ad view (922) represents the entire ad, while image (924), icon (926), title (928), text (930), and button (932) represent specific elements, or views, of the advertisement, and may be thought of as children of root ad view (922), as the ad view is hierarchal. The SDK may traverse through this hierarchy when an ad is displayed and send the gathered information back to the ad server for use in previewing subsequent ads for publishers. The ad view hierarchy may be serialized prior to be being sent to the ad server.

In FIG. 9C, user interface that includes an ad setup (940) window and a preview window is shown. Specifically, FIG. 9C shows the view a publisher may see when setting up an advertisement. In this example, the publisher has entered short text, medium text, advertiser icon, and other aspects of the ad, such as ad action setup (942) which specifies what actions are to be taken when the icon is selected. Because the ad server has received ad view information the ad server is able to create previews for the publisher of how their ad would look on given devices, and/or within a given application. Specifically, ad preview 1 (944), ad preview 2 (946), ad preview 3 (948), and ad preview 4 (950) show different previews of how the same advertisement may look. The four previews are different because the ad format is different for each one (i.e., the ad may be displayed on a different device, different application, different location within the stream, etc.).

Figure 10:
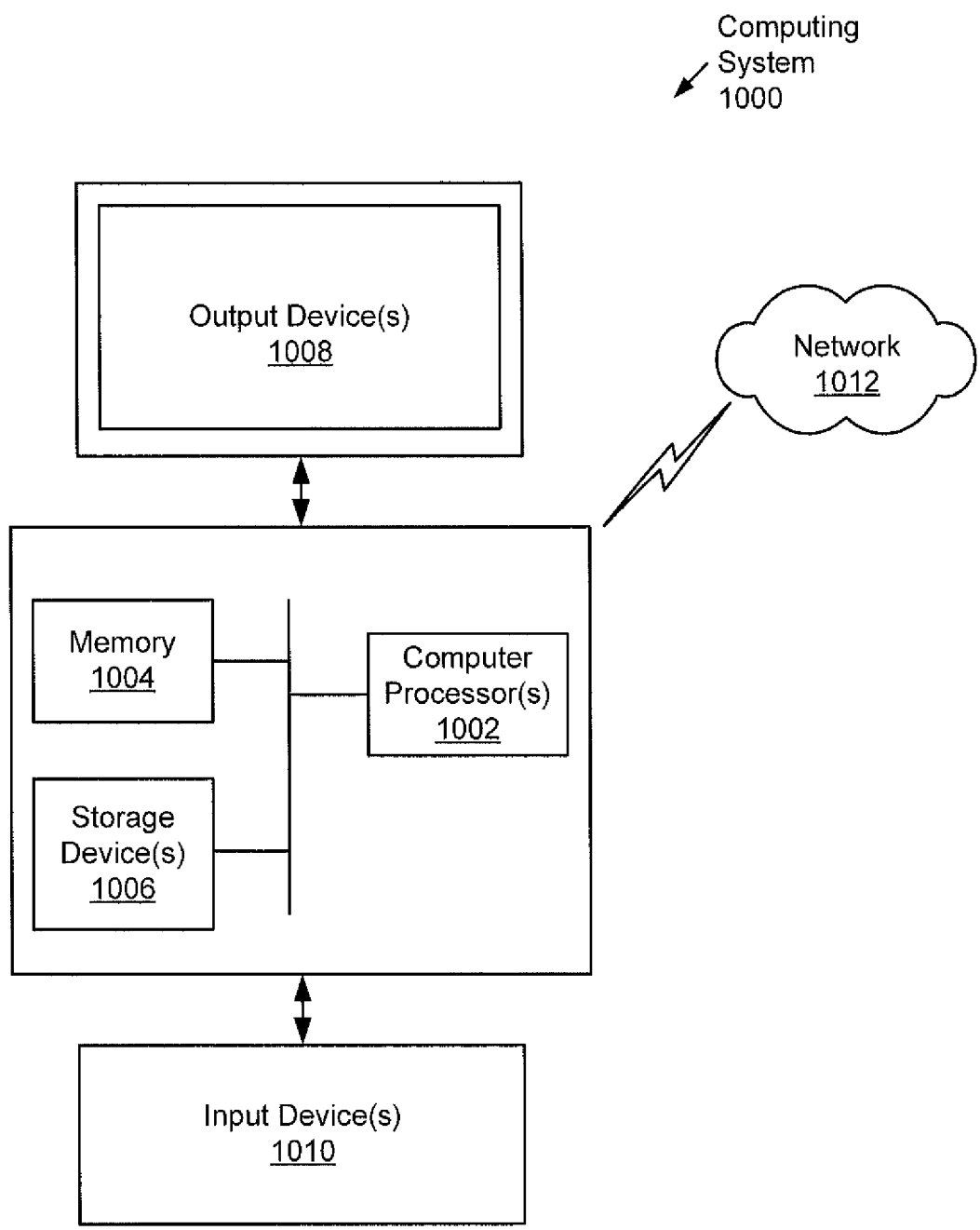
FIG. 10 shows a computing system in accordance with one or more embodiments of the invention.

Embodiments of the invention may be implemented on any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor. The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (1000) may be located at a remote location and connected to the other elements over a network (1012). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures may be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments can be devised which do not depart from the scope of the invention as disclosed herein.

What is claimed is:

1. A method comprising:
   sending, by a device, a request to a server;
   receiving, by the device and in response to the request, a plurality of text options, wherein each text option of the plurality of text options comprises a particular text sequence, wherein each respective particular text sequence has a particular length different from particular lengths of other particular text sequences of the plurality of text options;
   receiving, by the device and in response to the request, a uniform resource locator (URL), wherein the URL is partially complete;
   determining, by the device and based on one or more properties of an application currently executing on the device, a format comprising one or more aspects of a space within a graphical user interface for the application;
   selecting, by the device, a text option from the plurality of text options based on the format and the particular length of each respective text sequence of the plurality of text options;
   processing the URL to complete the URL based on the selected text option;

adjusting a format characteristic of the selected text option such that the selected text option fits within the space in the graphical user interface for the application; and outputting, by the device and for display, within the space in the graphical user interface for the application, the selected text option with the adjusted format characteristic.

2. The method of claim 1, further comprising:

receiving, by the device and in response to the request, an advertiser name; and outputting, by the device and for display, within the space in the graphical user interface for the application, the advertiser name.

3. The method of claim 1, A method, comprising:

sending, by a device, a request to a server;

receiving, by the device and in response to the request, a plurality of text options, wherein each text option of the plurality of text options comprises a particular text sequence, wherein each respective particular text sequence has a particular length different from particular lengths of other particular text sequences of the plurality of text options;

determining, by the device and based on one or more properties of an application currently executing on the device, a format comprising one or more aspects of a space within a graphical user interface for the application;

selecting, by the device, a text option from the plurality of text options based on the format and the particular length of each respective text sequence of the plurality of text options, wherein the length of the particular text sequence of the selected text option is directly correlated with a size of the space within the graphical user interface for the application;

adjusting a format characteristic of the selected text option such that the selected text option fits within the space in the graphical user interface for the application; and outputting, by the device and for display, within the space in the graphical user interface for the application, the selected text option with the adjusted format characteristic.

4. A method, comprising:

sending, by a device, a request to a server;

receiving, by the device and in response to the request, a plurality of text options, wherein each text option of the plurality of text options comprises a particular text sequence, wherein each respective particular text sequence has a particular length different from particular lengths of other particular text sequences of the plurality of text options;

determining, by the device and based on one or more properties of an application currently executing on the device, a first format comprising one or more aspects of a first space within a graphical user interface for the application;

selecting, by the device, a first text option from the plurality of text options based on the first format and the particular length of each respective text sequence of the plurality of text options;

adjusting a first format characteristic of the first text option such that the first text option fits within the first space in the graphical user interface for the application; and outputting, by the device and for display, within the first space in the graphical user interface for the application, the first text option with the adjusted first format characteristic;

determining, by the device and based on the one or more properties of the application currently executing on the device, a second format comprising one or more aspects of a second space within the graphical user interface for the application, wherein the second space is different than the first space;

selecting, by the device, a second text option from the plurality of text options based on the second format and the particular length of each respective text sequence of the plurality of text options;

adjusting a second format characteristic of the second text option such that the second text option fits within the second space in the graphical user interface for the application; and outputting, by the device and for display, within the second space in the graphical user interface for the application, the second text option with the adjusted second format characteristic.

5. A device comprising:

a computer-readable storage medium storing instructions that, when executed, cause the one or more processors to:

send a request to a server;

receive, in response to the request, a plurality of text options, wherein each text option of the plurality of text options comprises a particular text sequence, wherein each respective particular text sequence has a particular length different from the respective particular lengths of other particular text sequences of the plurality of text options;

receive, in response to the request, a uniform resource locator (URL), wherein the URL is partially complete;

determine, based on one or more properties of an application currently executing on the device, a format comprising one or more aspects of a space within a graphical user interface for the application;

select a text option from the plurality of text options based on the format and the respective particular lengths of each of the respective text sequences of the plurality of text options;

process the URL to complete the URL based on the selected text option;

adjust a format characteristic of the selected text option such that the selected text option fits within the space in the graphical user interface for the application; and output, for display, within the space in the graphical user interface for the application, the selected text option with the adjusted format characteristic.

6. The device of claim 5, wherein the instructions further cause the one or more processors to:

receive, in response to the request, an advertiser name; and output, for display, within the space in the graphical user interface for the application, the advertiser name.

7. A device comprising:

a computer-readable storage medium storing instructions that, when executed, cause the one or more processors to:

send a request to a server;

receive, in response to the request, a plurality of text options, wherein each text option of the plurality of text options comprises a particular text sequence, wherein each respective particular text sequence has a particular length different from the respective particular lengths of other particular text sequences of the plurality of text options;
determine, based on one or more properties of an application currently executing on the device, a format comprising one or more aspects of a space within a graphical user interface for the application;
select a text option from the plurality of text options based on the format and the respective particular lengths of each of the respective text sequences of the plurality of text options, wherein the length of the particular text sequence of the selected text option is directly correlated with a size of the space within the graphical user interface for the application;
adjust a format characteristic of the selected text option such that the selected text option fits within the space in the graphical user interface for the application; and
output, for display, within the space in the graphical user interface for the application, the selected text option with the adjusted format characteristic.

8. A device comprising:
a computer-readable storage medium storing instructions that, when executed, cause the one or more processors to:
send a request to a server;
receive, in response to the request, a plurality of text options, wherein each text option of the plurality of text options comprises a particular text sequence, wherein each respective particular text sequence has a particular length different from the respective particular lengths of other particular text sequences of the plurality of text options;
determine, based on one or more properties of an application currently executing on the device, a first format comprising one or more aspects of a space within a graphical user interface for the application;
select a first text option from the plurality of text options based on the first format and the respective particular lengths of each of the respective text sequences of the plurality of text options;
adjust a first format characteristic of the first text option such that the first text option fits within the first space in the graphical user interface for the application;
output, for display, within the first space in the graphical user interface for the application, the first text option with the adjusted first format characteristic;
determine, based on the one or more properties of the application currently executing on the device, a second format comprising one or more aspects of a second space within the graphical user interface for the application, wherein the second space is different than the first space;
select a second text option from the plurality of text options based on the second format and the particular length of each respective text sequence of the plurality of text options;
adjust a second format characteristic of the second text option such that the second text option fits within the second space in the graphical user interface for the application; and
output, for display, within the second space in the graphical user interface for the application, the second text option with the adjusted second format characteristic.

9. A non-transitory computer readable medium storing instructions that, when executed by one or more processors, cause the one or more processors to:
send a request to a server;
receive, in response to the request, a plurality of text options, wherein each text option of the plurality of text options comprises a particular text sequence, wherein each respective particular text sequence has a particular length different from the respective particular lengths of other particular text sequences of the plurality of text options;
receive, in response to the request, a uniform resource locator (URL), wherein the URL is partially complete;
determine, based on one or more properties of an application currently executing on the device, a format comprising one or more aspects of a space within a graphical user interface for the application;
select a text option from the plurality of text options based on the format and the respective particular lengths of each of the respective text sequences of the plurality of text options;
process the URL to complete the URL based on the selected text option;
adjust a format characteristic of the selected text option such that the selected text option fits within the space in the graphical user interface for the application; and
output, for display, within the space in the graphical user interface for the application, the selected text option with the adjusted format characteristic.

10. The non-transitory computer readable medium of claim 9, wherein the instructions further cause the one or more processors to:
receive, in response to the request, an advertiser name; and
output, for display, within the space in the graphical user interface for the application, the advertiser name.

11. The non transitory computer readable medium of claim 9, A non-transitory computer readable medium storing instructions that, when executed by one or more processors, cause the one or more processors to:
send a request to a server;
receive, in response to the request, a plurality of text options, wherein each text option of the plurality of text options comprises a particular text sequence, wherein each respective particular text sequence has a particular length different from the respective particular lengths of other particular text sequences of the plurality of text options;
determine, based on one or more properties of an application currently executing on the device, a format comprising one or more aspects of a space within a graphical user interface for the application;
select a text option from the plurality of text options based on the format and the respective particular lengths of each of the respective text sequences of the plurality of text options;
adjust a format characteristic of the selected text option such that the selected text option fits within the space in the graphical user interface for the application, including performing an action comprising one or more of:
increasing or decreasing a font size of the selected text option such that the entirety of the text option fills the space,
truncating the text option and adding ellipses to the truncated end of the text option,
changing a font type for the text option, adjusting spacing for the text option, or
summarizing the text option with a new text sequence; and
output, for display, within the space in the graphical user interface for the application, the selected text option with the adjusted format characteristic.

12. A non-transitory computer readable medium storing instructions that, when executed by one or more processors, cause the one or more processors to:
send a request to a server;
receive, in response to the request, a plurality of text options, wherein each text option of the plurality of text options comprises a particular text sequence, wherein each respective particular text sequence has a particular length different from the respective particular lengths of other particular text sequences of the plurality of text options;
determine, based on one or more properties of an application currently executing on the device, a format comprising one or more aspects of a space within a graphical user interface for the application;
select a text option from the plurality of text options based on the format and the respective particular lengths of each of the respective text sequences of the plurality of text options, wherein the length of the particular text sequence of the selected text option is directly correlated with a size of the space within the graphical user interface for the application;
adjust a format characteristic of the selected text option such that the selected text option fits within the space in the graphical user interface for the application; and
output, for display, within the space in the graphical user interface for the application, the selected text option with the adjusted format characteristic.

13. A non-transitory computer readable medium storing instructions that, when executed by one or more processors, cause the one or more processors to:
send a request to a server;
receive, in response to the request, a plurality of text options, wherein each text option of the plurality of text options comprises a particular text sequence, wherein each respective particular text sequence has a particular length different from the respective particular lengths of other particular text sequences of the plurality of text options;
determine, based on one or more properties of an application currently executing on the device, a first format comprising one or more aspects of a first space within a graphical user interface for the application;
select a first text option from the plurality of text options based on the first format and the respective particular lengths of each of the respective text sequences of the plurality of text options;
adjust a first format characteristic of the first text option such that the first text option fits within the first space in the graphical user interface for the application;
output, for display, within the first space in the graphical user interface for the application, the first text option with the adjusted first format characteristic;
determine, based on the one or more properties of the application currently executing on the device, a second format comprising one or more aspects of a second space within the graphical user interface for the application, wherein the second space is different than the first space;
select a second text option from the plurality of text options based on the second format and the particular length of each respective text sequence of the plurality of text options;
adjust a second format characteristic of the second text option such that the second text option fits within the second space in the graphical user interface for the application; and
output, for display, within the second space in the graphical user interface for the application, the second text option with the adjusted second format characteristic.

14. A method comprising:
sending, by a device, a request to a server;
receiving, by the device and in response to the request, a plurality of text options, wherein each text option of the plurality of text options comprises a particular text sequence, wherein each respective particular text sequence has a particular length different from particular lengths of other particular text sequences of the plurality of text options;
determining, by the device and based on one or more properties of an application currently executing on the device, a format comprising one or more aspects of a space within a graphical user interface for the application;
selecting, by the device, a text option from the plurality of text options based on the format and the particular length of each respective text sequence of the plurality of text options wherein the length of the particular text sequence of the selected text option is directly correlated with a size of the space within the graphical user interface for the application;
adjusting the selected text option, said adjusting including one or more of:
increasing or decreasing a font size of the selected text option such that the entirety of the text option fills the ad space;
truncating the text option and adding ellipses to the truncated end of the text option;
changing a font type for the text option;
adjusting spacing for the text option; or
summarizing the text option with a new text sequence; and
outputting, by the device and for display, within the space in the graphical user interface for the application, the selected text option.

15. A method comprising:
sending, by a device, a request to a server;
receiving, by the device and in response to the request, a plurality of text options, wherein each text option of the plurality of text options comprises a particular text sequence, wherein each respective particular text sequence has a particular length different from particular lengths of other particular text sequences of the plurality of text options;
determining, by the device and based on one or more properties of an application currently executing on the device, a format comprising one or more aspects of a space within a graphical user interface for the application;
selecting, by the device, a text option from the plurality of text options based on the format and the particular length of each respective text sequence of the plurality of text options;
adjusting the selected text option, said adjusting including one or more of:

increasing or decreasing a font size of the selected text option such that the entirety of the text option fills the ad space by:
   determining, by the device, a largest font size where the entirety of the text option fits within the space; and
   adjusting, by the device, the font size of the selected text option to be equal to the largest font size where the entirety of the text option fits within the space;
truncating the text option and adding ellipses to the truncated end of the text option;
changing a font type for the text option;
adjusting spacing for the text option; or
summarizing the text option with a new text sequence; and outputting, by the device and for display, within the space in the graphical user interface for the application, the selected text option.

16. A method comprising:
sending, by a device, a request to a server;
receiving, by the device and in response to the request, a plurality of text options, wherein each text option of the plurality of text options comprises a particular text sequence, wherein each respective particular text sequence has a particular length different from particular lengths of other particular text sequences of the plurality of text options;
determining, by the device and based on one or more properties of an application currently executing on the device, a first format comprising one or more aspects of a first space within a graphical user interface for the application;
selecting, by the device, a first text option from the plurality of text options based on the first format and the particular length of each respective text sequence of the plurality of text options;
adjusting the first text option, said adjusting including one or more of:
   increasing or decreasing a font size of the first text option such that the entirety of the first text option fills the ad space;
   truncating the first text option and adding ellipses to the truncated end of the text option;
   changing a font type for the first text option;
   adjusting spacing for the first text option; or
   summarizing the first text option with a new text sequence; and
outputting, by the device and for display, within the first space in the graphical user interface for the application, the first text option;
determining, by the device and based on the one or more properties of the application currently executing on the device, a second format comprising one or more aspects of a second space within the graphical user interface for the application, wherein the second space is different than the first space;
selecting, by the device, a second text option from the plurality of text options based on the second format and the particular length of each respective text sequence of the plurality of text options;
adjusting the selected second text option, said adjusting including one or more of:
   increasing or decreasing a font size of the second text option such that the entirety of the second text option fills the second space;
   truncating the second text option and adding ellipses to the truncated end of the text option;
   changing a font type for the second text option;
   adjusting spacing for the second text option; or
   summarizing the second text option with a new text sequence; and
outputting, by the device and for display, within the second space in the graphical user interface for the application, the second text option.

* * * * *